United States Patent
Park et al.

(10) Patent No.: US 11,030,005 B2
(45) Date of Patent: *Jun. 8, 2021

(54) CONFIGURATION OF APPLICATION SOFTWARE ON MULTI-CORE IMAGE PROCESSOR

(71) Applicant: Google LLC, Mountain View, CA (US)

(72) Inventors: Hyunchul Park, Santa Clara, CA (US); Albert Meixner, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/657,656

(22) Filed: Oct. 18, 2019

(65) Prior Publication Data

US 2020/0050486 A1   Feb. 13, 2020

Related U.S. Application Data

(63) Continuation of application No. 15/594,529, filed on May 12, 2017, now Pat. No. 10,467,056.

(51) Int. Cl.
*G06F 9/50* (2006.01)
*G06T 1/20* (2006.01)

(52) U.S. Cl.
CPC ............ *G06F 9/5005* (2013.01); *G06F 9/505* (2013.01); *G06T 1/20* (2013.01)

(58) Field of Classification Search
CPC ..................................................... G06F 9/5005
See application file for complete search history.

(56) References Cited

U.S. PATENT DOCUMENTS

| 7,728,842 | B2 | 6/2010 | Honmi |
| 7,818,725 | B1 | 10/2010 | Agarwal |
| 2003/0065688 | A1 | 4/2003 | Dageville et al. |
| 2006/0036798 | A1 | 2/2006 | Dickey et al. |
| 2009/0150135 | A1 | 6/2009 | Cressman |

(Continued)

FOREIGN PATENT DOCUMENTS

| TW | 201206165 A | 2/2012 |
| WO | WO 2016/171869 | 10/2016 |

OTHER PUBLICATIONS

JP Office Action in Japanese Application No. 2019-539225, dated Jul. 14, 2020, 4 pages (with English translation).

(Continued)

*Primary Examiner* — Sisley N Kim
(74) *Attorney, Agent, or Firm* — Fish & Richardson P.C.

(57) ABSTRACT

A method is described. The method includes calculating data transfer metrics for kernel-to-kernel connections of a program having a plurality of kernels that is to execute on an image processor. The image processor includes a plurality of processing cores and a network connecting the plurality of processing cores. Each of the kernel-to-kernel connections include a producing kernel that is to execute on one of the processing cores and a consuming kernel that is to execute on another one of the processing cores. The consuming kernel is to operate on data generated by the producing kernel. The method also includes assigning kernels of the plurality of kernels to respective ones of the processing cores based on the calculated data transfer metrics.

20 Claims, 28 Drawing Sheets

(56) References Cited

U.S. PATENT DOCUMENTS

| | | | |
|---|---|---|---|
| 2011/0088038 A1* | 4/2011 | Kruglick | G06F 9/54 |
| | | | 718/104 |
| 2011/0191758 A1 | 8/2011 | Scharf | |
| 2012/0102500 A1 | 4/2012 | Waddington et al. | |
| 2013/0219130 A1 | 8/2013 | Zetterman et al. | |
| 2016/0314555 A1* | 10/2016 | Zhu | G06T 1/60 |
| 2016/0350212 A1 | 12/2016 | Jeong | |

OTHER PUBLICATIONS

Bartic et al. "Mapping concurrent applications on network-on-chip platforms," IEEE Workshop on Signal Processing Systems Design and Implementation, Nov. 2005, 6 pages.

Daga et al. "Architecture-Aware Mapping and Optimization on a 1600-Core GPU," 17th IEEE International Conference on Parallel and Distributed Systems, Dec. 2011, 8 pages.

Dummler et al. "Mapping Algorithms for Multiprocessor Tasks on Multi-core Clusters," 37th International Conference on Parallel Processing, Sep. 2008, 8 pages.

International Search Report and Written Opinion issued in International Application No. PCT/US2018/013445, dated Apr. 25, 2018, 15 pages.

Keinert et al. "Actor-Oriented Modeling and Simulation of Sliding Window Image Processing Algorithms," IEEE Workshop on Embedded Systems for Real-Time Multimedia, Oct. 2007, 6 pages.

Keinert et al. "Simulative Buffer Analysis of Local Image Processing Algorithms Described by Windowed Synchronous Data Flow," IEEE International Conference on Embedded Computer Systems: Architectures, Modeling and Simulation, Jul. 2007, 8 pages.

Lin et al. "Heterogeneous Multiprocessor Mapping for Real-Time Streaming Systems," IEEE International Conference on Acoustics, Speech and Signal Processing, May 2011, 4 pages.

Park et al. "Modulo Graph Embedding: Mapping Applications onto Course-Grained Reconfigurable Architectures," Proceedings of the 2006 International Conference on Compilers Architecture, Synthesis for Embedded Systems, ACM, Oct. 2006, 11 pages.

TW Office Action issued in Taiwanese Application No. 107104239, dated Nov. 21, 2018, 5 pages (English translation).

PCT International Preliminary Report on Patentability issued in International Application No. PCT/US2018/013445, dated Nov. 19, 2019, 2019, 10 pages.

KR Office Action in Korean Application No. 10-2019-7021661, dated Aug. 12, 2020, 14 pages (with English translation).

* cited by examiner

| Scalar instruction 951 | 2D ALU Instruction 952 | Memory Access Instruction 953 | Immediate Operand 954 |

Fig. 9b

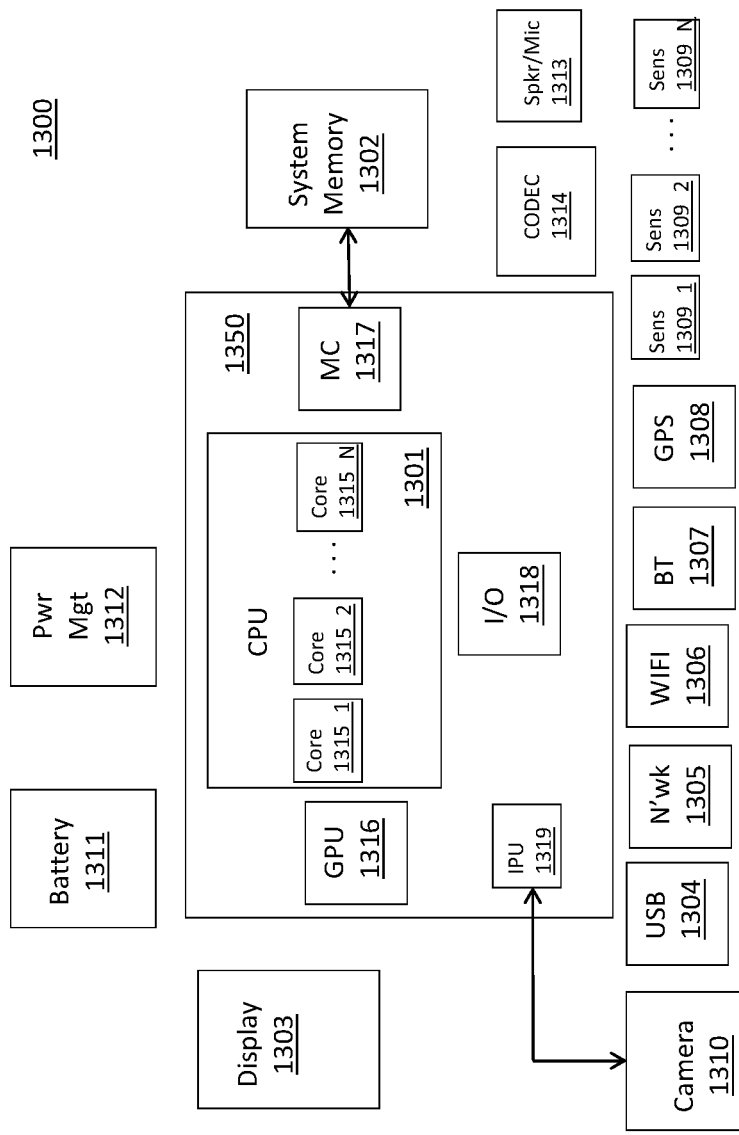

CONFIGURATION OF APPLICATION SOFTWARE ON MULTI-CORE IMAGE PROCESSOR

CROSS-REFERENCE TO RELATED APPLICATION

This application is a continuation of U.S. application Ser. No. 15/594,529, filed May 12, 2017, the contents of which are incorporated by reference herein.

FIELD OF INVENTION

The field of invention pertains generally to the computing sciences and, more specifically, to the configuration of application software on a multi-core image processor.

BACKGROUND

Image processing typically involves the processing of pixel values that are organized into an array. Here, a spatially organized two dimensional array captures the two dimensional nature of images (additional dimensions may include time (e.g., a sequence of two dimensional images) and data type (e.g., colors). In a typical scenario, the arrayed pixel values are provided by a camera that has generated a still image or a sequence of frames to capture images of motion. Traditional image processors typically fall on either side of two extremes.

A first extreme performs image processing tasks as software programs executing on a general purpose processor or general purpose-like processor (e.g., a general purpose processor with vector instruction enhancements). Although the first extreme typically provides a highly versatile application software development platform, its use of finer grained data structures combined with the associated overhead (e.g., instruction fetch and decode, handling of on-chip and off-chip data, speculative execution) ultimately results in larger amounts of energy being consumed per unit of data during execution of the program code.

A second, opposite extreme applies fixed function hard-wired circuitry to much larger units of data. The use of larger (as opposed to finer grained) units of data applied directly to custom designed circuits greatly reduces power consumption per unit of data. However, the use of custom designed fixed function circuitry generally results in a limited set of tasks that the processor is able to perform. As such, the widely versatile programming environment (that is associated with the first extreme) is lacking in the second extreme.

A technology platform that provides for both highly versatile application software development opportunities combined with improved power efficiency per unit of data remains a desirable yet missing solution.

SUMMARY

A method is described. The method includes calculating data transfer metrics for kernel-to-kernel connections of a program having a plurality of kernels that is to execute on an image processor. The image processor includes a plurality of processing cores and a network connecting the plurality of processing cores. Each of the kernel-to-kernel connections include a producing kernel that is to execute on one of the processing cores and a consuming kernel that is to execute on another one of the processing cores. The consuming kernel is to operate on data generated by the producing kernel. The method also includes assigning kernels of the plurality of kernels to respective ones of the processing cores based on the calculated data transfer metrics.

FIGURES

The following description and accompanying drawings are used to illustrate embodiments of the invention. In the drawings:

FIG. 9b shows an embodiment of an instruction word of the stencil processor;

FIG. 13 shows an exemplary computing system.

DETAILED DESCRIPTION

1.0 Unique Image Processor Architecture

As is known in the art, the fundamental circuit structure for executing program code includes an execution stage and register space. The execution stage contains the execution units for executing instructions. Input operands for an instruction to be executed are provided to the execution stage from the register space. The resultant that is generated from the execution stage's execution of an instruction is written back to the register space.

Execution of a software thread on a traditional processor entails sequential execution of a series of instructions through the execution stage. Most commonly, the operations are "scalar" in the sense that a single resultant is generated from a single input operand set. However in the case of "vector" processors, the execution of an instruction by the execution stage will generate a vector of resultants from a vector of input operands.

Figure 1:
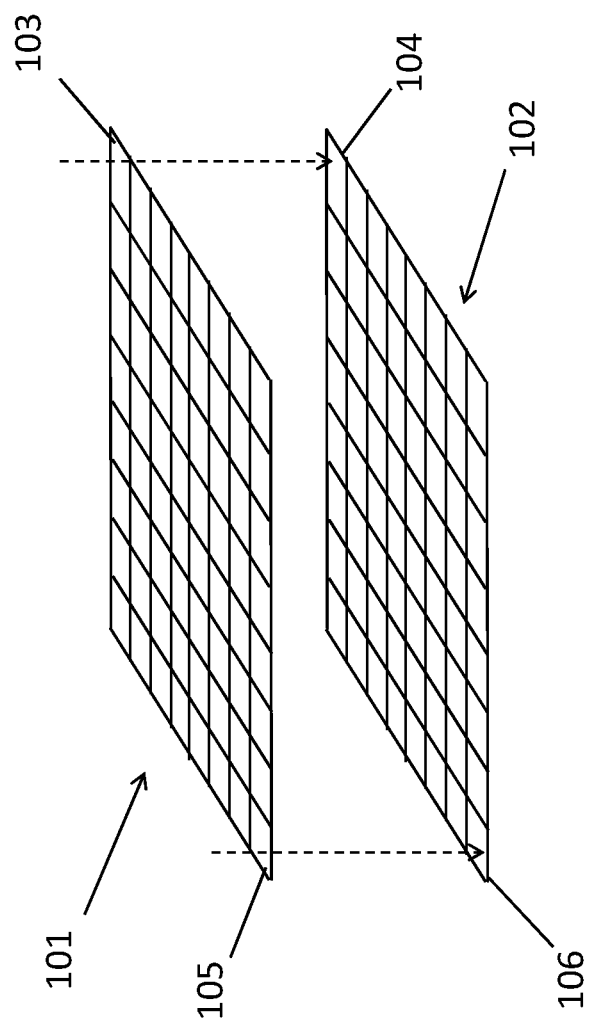
FIG. 1 shows a high level view of a stencil processor architecture.

FIG. 1 shows a high level view of a unique image processor architecture 100 that includes an array of execution lanes 101 coupled to a two-dimensional shift register array 102. Here, each execution lane in the execution lane array can be viewed as a discrete execution stage that contains the execution units needed to execute the instruction set supported by the processor 100. In various embodiments each execution lane receives a same instruction to execute in a same machine cycle so that the processor operates as a two dimensional single instruction multiple data (SIMD) processor.

Each execution lane has its own dedicated register space in a corresponding location within the two dimensional shift register array 102. For example, corner execution lane 103 has its own dedicated register space in corner shift register location 104, corner execution lane 105 has its own dedicated register space in corner shift register location 106, etc.

Additionally, the shift register array 102 is able to shift its contents so that each execution lane is able to directly operate, from its own register space, upon a value that was resident in another execution lane's register space during a prior machine cycle. For example, a +1 horizontal shift causes each execution lane's register space to receive a value from its leftmost neighbor's register space. On account of an ability to shift values in both left and right directions along a horizontal axis, and shift values in both up and down directions along a vertical axis, the processor is able to efficiently process stencils of image data.

Here, as is known the art, a stencil is a slice of image surface area that is used as a fundamental data unit. For example, a new value for a particular pixel location in an output image may be calculated as an average of the pixel values in an area of an input image that the particular pixel location is centered within. For example, if the stencil has a dimension of 3 pixels by 3 pixels, the particular pixel location may correspond to the middle pixel of the 3×3 pixel array and the average may be calculated over all nine pixels within the 3×3 pixel array.

According to various operational embodiments of the processor 100 of FIG. 1, each execution lane of the execution lane array 101 is responsible for calculating a pixel value for a particular location in an output image. Thus, continuing with the 3×3 stencil averaging example mentioned just above, after an initial loading of input pixel data and a coordinated shift sequence of eight shift operations within the shift register, each execution lane in the execution lane array will have received into its local register space all nine pixel values needed to calculate the average for its corresponding pixel location. That is, the processor is able to simultaneously process multiple overlapping stencils centered at, e.g., neighboring output image pixel locations. Because the processor architecture of FIG. 1 is particularly adept at processing over image stencils it may also be referred to as a stencil processor.

Figure 2:
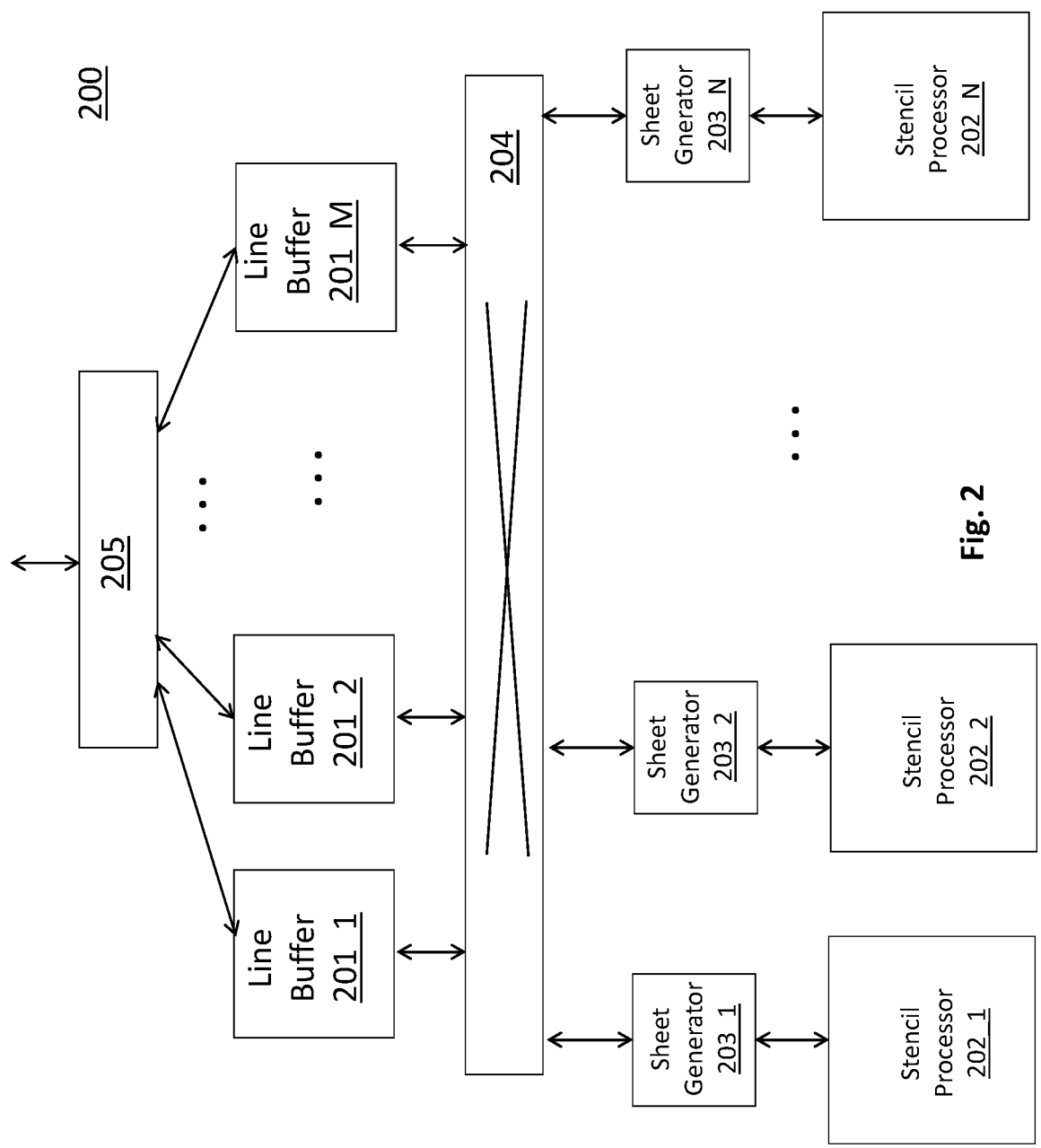
FIG. 2 shows a more detailed view of an image processor architecture.

FIG. 2 shows an embodiment of an architecture 200 for an image processor having multiple stencil processors 202_1 through 202_N. As observed in FIG. 2, the architecture 200 includes a plurality of line buffer units 201_1 through 201_M interconnected to a plurality of stencil processor units 202_1 through 202_N and corresponding sheet generator units 203_1 through 203_N through a network 204 (e.g., a network on chip (NOC) including an on chip switch network, an on chip ring network or other kind of network). In an embodiment, any line buffer unit 201_1 through 201_M may connect to any sheet generator 203_1 through 203_N and corresponding stencil processor 202_1 through 201_N through the network 204.

Program code is compiled and loaded onto a corresponding stencil processor 202 to perform the image processing operations earlier defined by a software developer (program code may also be loaded onto the stencil processor's associated sheet generator 203, e.g., depending on design and implementation). As such, each stencil processor 202_1 through 202_N may be more generally characterized as a processing core, processor core, core and the like and the overall image processor may be characterized as a multi-core image processor. In at least some instances an image processing pipeline may be realized by loading a first kernel program for a first pipeline stage into a first stencil processor 202_1, loading a second kernel program for a second pipeline stage into a second stencil processor 202_2, etc. where the first kernel performs the functions of the first stage of the pipeline, the second kernel performs the functions of the second stage of the pipeline, etc. and additional control flow methods are installed to pass output image data from one stage of the pipeline to the next stage of the pipeline.

In other configurations, the image processor may be realized as a parallel machine having two or more stencil processors 202_1, 202_2 operating the same kernel program code. For example, a highly dense and high data rate stream of image data may be processed by spreading frames across multiple stencil processors each of which perform the same function.

In yet other configurations, essentially any directed acyclic graph (DAG) of kernels may be loaded onto the image processor by configuring respective stencil processors with their own respective kernel of program code and configuring appropriate control flow hooks into the hardware to direct output images from one kernel to the input of a next kernel in the DAG design.

As a general flow, frames of image data are received by a macro I/O unit 205 and passed to one or more of the line buffer units 201 on a frame by frame basis. A particular line buffer unit parses its frame of image data into a smaller region of image data, referred to as a "line group", and then passes the line group through the network 204 to a particular sheet generator. A complete or "full" singular line group may be composed, for example, with the data of multiple contiguous complete rows or columns of a frame (for simplicity the present specification will mainly refer to contiguous rows). The sheet generator further parses the line group of image data into a smaller region of image data, referred to as a "sheet", and presents the sheet to its corresponding stencil processor.

In the case of an image processing pipeline or a DAG flow having a single input, generally, input frames are directed to the same line buffer unit 201_1 which parses the image data into line groups and directs the line groups to the sheet generator 203_1 whose corresponding stencil processor 202_1 is executing the code of the first kernel in the pipeline/DAG. Upon completion of operations by the stencil processor 202_1 on the line groups it processes, the sheet generator 203_1 sends output line groups to a "downstream" line buffer unit 201_2 (in some use cases the output line group may be sent_back to the same line buffer unit 201_1 that earlier had sent the input line groups).

One or more "consumer" kernels that represent the next stage/operation in the pipeline/DAG executing on their own respective other sheet generator and stencil processor (e.g., sheet generator 203_2 and stencil processor 202_2) then receive from the downstream line buffer unit 201_2 the image data generated by the first stencil processor 202_1. In this manner, a "producer" kernel operating on a first stencil processor has its output data forwarded to a "consumer" kernel operating on a second stencil processor where the consumer kernel performs the next set of tasks after the producer kernel consistent with the design of the overall pipeline or DAG.

As alluded to above with respect to FIG. 1, each stencil processor 202_1 through 202_N is designed to simultaneously operate on multiple overlapping stencils of image data. The multiple overlapping stencils and internal hardware processing capacity of the stencil processor effectively determines the size of a sheet. Again, as discussed above, within any of stencil processors 202_1 through 202_N, arrays of execution lanes operate in unison to simultaneously process the image data surface area covered by the multiple overlapping stencils.

Additionally, in various embodiments, sheets of image data are loaded into the two-dimensional shift register array of a stencil processor 202 by that stencil processor's corresponding (e.g., local) sheet generator 203. The use of sheets and the two-dimensional shift register array structure is believed to effectively provide for power consumption improvements by moving a large amount of data into a large amount of register space as, e.g., a single load operation with processing tasks performed directly on the data immediately thereafter by an execution lane array. Additionally, the use of an execution lane array and corresponding register array provide for different stencil sizes that are easily programmable/configurable. More details concerning the operation of the line buffer units, sheet generators and stencil processors are provided further below in Section 3.0.

Figure 3:
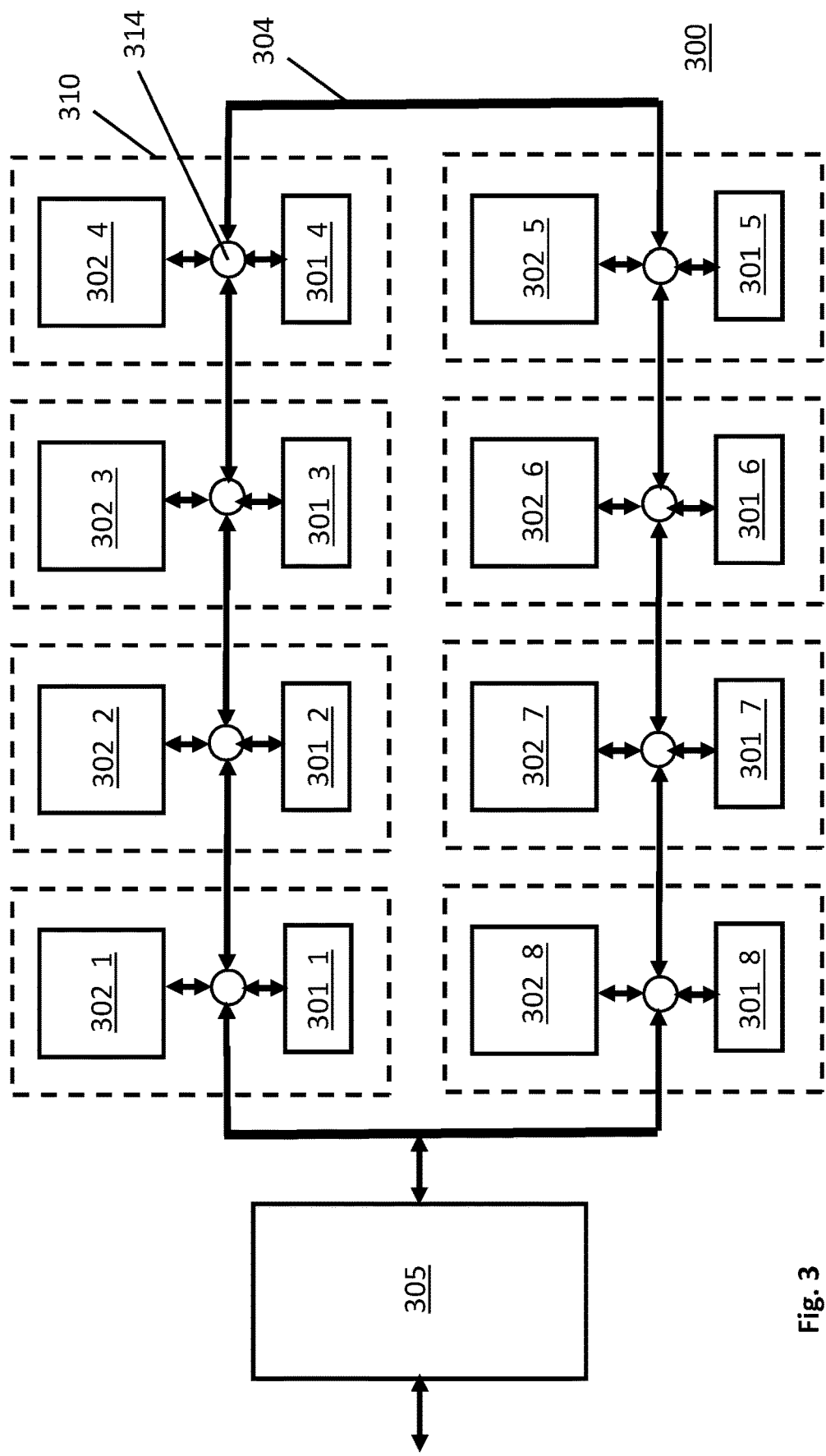
FIG. 3 shows an even more detailed view of an image processor architecture.

FIG. 3 shows a more detailed embodiment of a specific hardware implementation of the image processor of FIG. 2. As observed in FIG. 3, the network 204 of FIG. 2 is implemented in a ring topology 304 with a 4×4 network node 314 at each intersection between a line buffer unit 301 and sheet generator/stencil processor core 302. For simplicity, FIG. 3 only labels the network node 314 that resides between line buffer unit 301_4 and sheet generator/stencil processor core 302_4.

Here, each of sheet generator/stencil processor cores 302_1 through 302_8 are understood to include both a stencil processor and its corresponding sheet generator. For simplicity, each of the sheet generator/stencil processor cores 302_1 through 302_8 will hereinafter be referred to simply as a stencil processor core or core. Although eight line buffer units 301_1 through 301_8 and eight cores 302_1 through 402_8 are depicted in the particular embodiment of FIG. 3 it should be understood that different architectures are possible having different numbers of line buffer units and/or cores. Network topologies other than a ring topology are also possible.

With respect to the image processor of FIG. 3, the ring network 304 permits: 1) the I/O unit 305 to pass input data to any line buffer unit 301_1 through 301_8 (or any core 302_1 through 302_8); 2) any line buffer unit 301_1 to 301_8 to forward a line group to any core 302_1 through 302_8; 3) any core 302_1 through 302_8 to pass its output data to any line buffer unit 301_1 through 301_8; and, 4) any line buffer unit 301_1 through 301_8 to pass image processor output data to I/O unit 305. As such, a wealth of different software kernel loading options and internal network configurations are possible. That is, theoretically, for any software application composed of multiple kernels to be executed on the various cores 302 of the processor, any kernel can be loaded onto any core and any line buffer unit can be configured to source/sink input/output data to/from any core.

2.0 Configuration of Application Software on Image Processor

Figure 4:
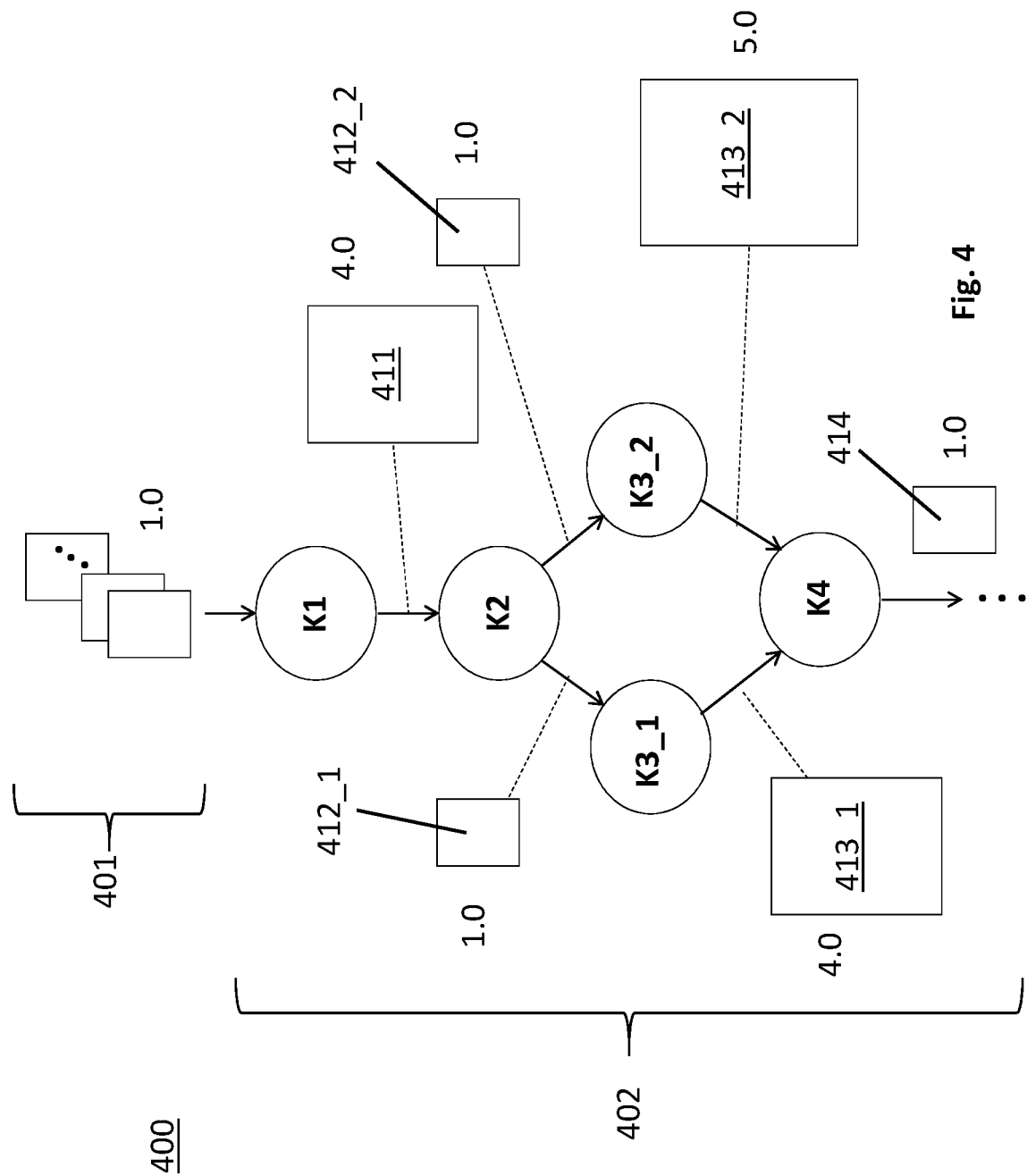
FIG. 4 shows an application software program that can be executed by an image processor.

FIG. 4 shows an exemplary application software program or portion thereof that may be loaded onto the image processor of FIG. 3. As observed in FIG. 4, the program code may be expected to process one or more frames of input image data 401 to effect some overall transformation on the input image data 401. The transformation is realized with the operation of one or more kernels of program code 402 that operate on the input image data in an orchestrated sequence articulated by the application software developer.

In the example of FIG. 4, the overall transformation is effected by first processing each input image with a first kernel K1. The output images produced by kernel K1 are then operated on by kernel K2. Each of the output images produced by kernel K2 are then operated on by kernel K3_1 or K3_2, The output images produced by kernel(s) K3_1/K3_2 are then operated on by kernel K4. In the particular example of FIG. 3, Kernels K3_1 and K3_2 may be, e.g., different kernels that perform different image processing operations (e.g., kernel K3_1 operates on input images of a first specific type and kernel K3_2 operates on input images of a second, different type).

For simplicity only four kernels K1 through K4 are shown. In reference to the image processor hardware architecture embodiment of FIG. 3, note that, in a basic configuration where each kernel operates on a different stencil processor, conceivably, four more kernels may flow from kernel K4 before all the cores 402 of the processor are executing a kernel (the four kernel flow of FIG. 4 only utilizes half the cores of the processor of FIG. 3).

FIG. 4 also shows that different image sizes may be associated with the various kernel inputs/outputs. Here, as mentioned above, the image processor receives a series of input frames 401. The size of each of the input frames (e.g., the total number of pixels in any one frame) is depicted as having a normalized size of unity (1.0). Kernel K1 operates on the input frames 401 to generate output frames 411 each having a size that is four times that of the input frames (the output frame size of kernel K1 is shown having a size of 4.0). The increase in image size may be effected, e.g., by kernel K1 performing up-sampling on the input image frames 401.

Kernel K2 processes the (larger) output image frames 411 generated by kernel K1 and generates smaller output image frames 412_1, 412_2 each having a unity size (1.0). The decrease in size may be effected, e.g., by kernel K2 performing down-sampling on the output images 411 of kernel K1. Kernel K3 operates on frames 412_1 to generate larger output frames having a normalized size of 4.0 while kernel K3_2 operates on frames 412_2 to generate even larger output frames having a normalized size of 5.0. Kernel K4 operates on the output images 413_1, 413_2 of kernels K3_1 and K3_2 to generate output frames of unity size 1.0.

As can be seen from the example of FIG. 4, different amounts of data can be passed between kernels depending on, e.g., the size of frames generated by a producing kernel that are processed by a consuming kernel. Here, referring back to the exemplary hardware implementation of FIG. 3, it improves overall processor efficiency to place producing and consuming kernels that pass large amounts of data between one another on stencil processors that are next to one another or at least close to one another in order to avoid passing large amounts of data for long distances along the ring 304.

As such, recalling from the discussion of FIG. 3 that the processor implementation 300 is extremely versatile in terms of the different kernel-to-core placements and kernel-to-kernel interconnections it can support, it is pertinent to analyze the data flow of an application software program to be configured to run on the processor 300 so that its kernels can be placed on specific cores and its line buffers can be configured to source/sink specific kernels/cores such that larger sized data flows experience fewer hops along the network 304 and, e.g., smaller sized data flows are permitted to experience more hops along the network 304.

Figure 5:
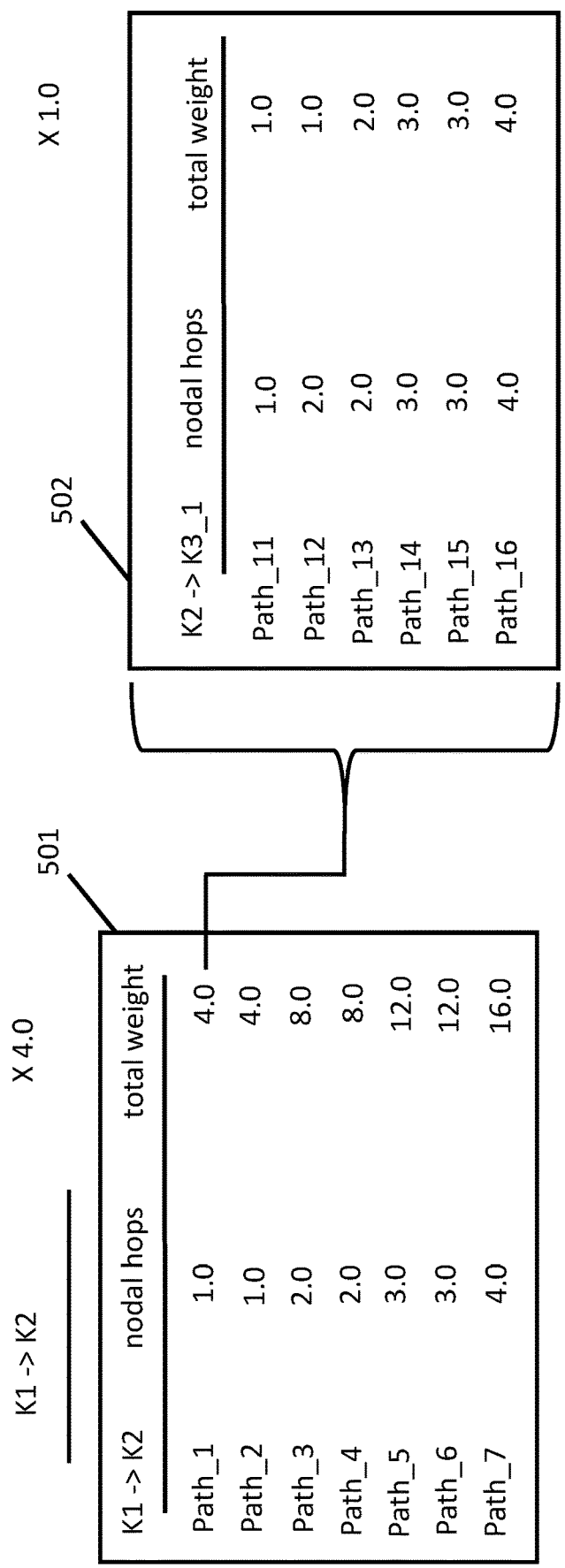
FIGS. 5 and 6 show an embodiment for determining a configuration for the application software program of FIG. 4 to execute an image processor.
Figure 6:
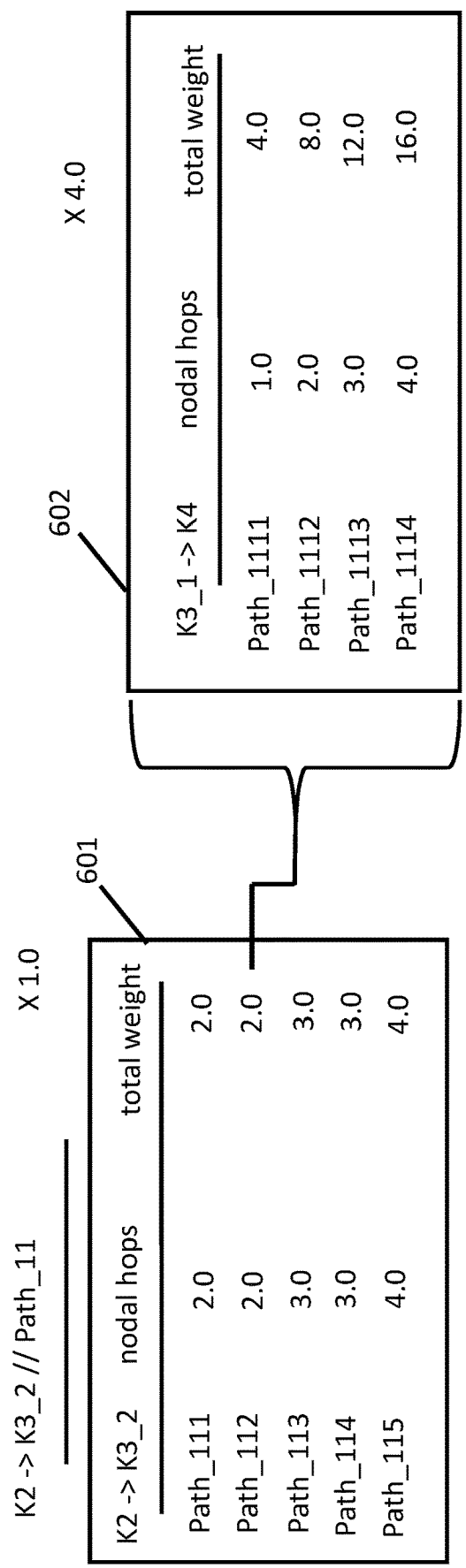

FIGS. 5 and 6 graphically depict some of the calculations of an affinity mapper software program that analyzes an application software program and maps its specific kernels to specific cores so that efficient data flows are achieved within the processor. For ease of illustration, FIGS. 5 and 6 demonstrate exemplary calculations for the application software flow of FIG. 4. As will be more apparent in the immediately following discussion, the affinity mapper threads through different possible combinations of kernel-to-core placements in order to identify a more optimal overall configuration that maps each kernel of an application software program to a particular processing core.

As part of these calculations, the mapper determines metrics for the various connections that indicate how inefficient or burdensome a particular connection will be if implemented. In various embodiments, the mapper assigns weights to the various connections that are being analyzed, where, larger data transfers along more nodal hops and/or longer distances along the network ring are assigned higher weights and smaller data transfers along fewer nodal hops and/or shorter distances along the network ring are assigned smaller weights. Other possible factors may include, e.g., larger or smaller propagation delay along a connection from, e.g., slower vs. faster transfer speeds.

Thus, more generically, higher weight corresponds to less internal processor data transfer efficiency and/or greater data transport burden. In various embodiments, the configuration that yields the lowest overall weight is ultimately chosen as the correct configuration for the processor. Alternate embodiments may choose to assign higher weights to less burdensome data transfers and attempt to find a configuration that yields the highest total weight. For ease of discussion the remainder of the document will mainly describe an approach in which higher weights are assigned to less efficient or more burdensome connections. Regardless, in various embodiments, a complete configuration corresponds to identifying: 1) which kernels operate on which cores; 2) which line buffers source (feed) which kernels; and, 3) which line buffers sink (receive output data from) which kernels.

For simplicity, the exemplary affinity mapping process of FIGS. 5 and 6 does not address the connection between the I/O unit 305 and the line buffer unit that feeds input frames to the first kernel K1. FIG. 5 outlines an exemplary set of calculations for the K1 to K2 kernel connection of FIG. 4. Here, as discussed above, a first "producing" kernel (K1) operates on a first core and forwards its output data to a line buffer unit. The line buffer unit then forwards the data received from the first kernel (K1) to the second, "consuming" kernel (K2).

In an embodiment, in order to keep the size of the search space contained, and to simplify allocation of line buffer unit memory resources, kernel-to-kernel connections are modeled by the mapping algorithm without consideration of any intervening line buffer unit. That is, the presence of the line buffer units are initially ignored by the mapping algorithm even though in actuality data transfers from a producing kernel to a consuming kernel are essentially queued by an intervening line buffer unit.

FIG. 5 shows weight assignments for various configurations of kernel K1 sending its output data to its consuming kernel K2. This particular connection is labeled "K1→K2" in FIG. 5. A first table 501 (labeled "K1→K1") shows the set of available/possible connections between kernel K1 and consuming kernel K2. Here, using the processor implementation of FIG. 3 as the target architecture, all connections are possible. That is, assuming the first producing kernel K1 is mapped onto a particular one of processing cores 302_1 through 302_8, its corresponding consuming kernel K2 can be placed onto any of the other seven remaining processing cores.

First and second connections listed in table 501, labeled "Path_1" and "Path_2" respectively, correspond to kernel K1 sending its output data to either one of its neighboring cores (where consuming kernel K2 operates). For example, referring to FIG. 3, if kernel K1 is operating on core 302_2, Path_1 corresponds to kernel K2 operating on core 302_1 and Path_2 corresponds to kernel K2 operating on core 302_3. Two more paths, Path_3 and Path_4 correspond to kernel K1's output data being sent to one of the processing cores that reside on the opposite side of the cores that neighbor K1's core. For example, again assuming kernel K1 is operating on core 301_2, Path_3 corresponds to kernel K2 operating on core 302_4 and Path_4 corresponds to kernel K2 operating on core 302_8.

Here, note that both Path_1 and Path_2 are each assigned a nodal hop distance of 1.0. One unit of nodal hop distance corresponds to one logical unit length along the network ring 304. That is, the distance from a core to either of its immediate neighbors is assigned a nodal hop distance of 1.0. Because both Path_1 and Path_2 send K1's output data to one of its neighboring cores, both of these paths are assigned a nodal hop distance of 1.0. By contrast, each of Path_3 and Path_4 have a nodal hop distance of 2.0 in table 501 because, as discussed above, Path_3 and Path_4 correspond to kernel K1's data being forwarded two core locations around the ring from the core that kernel K1 operates from.

Continuing with this approach, Path_5 and Path_6 correspond to the forwarding of K1's output data to either of the cores that are three nodal hops away from K1's core (these paths have a nodal hop distance of 3.0). Finally, Path_7 has a nodal hop distance of 4.0 and corresponds to the (single) path that is oppositely positioned from K1's core on the network ring. For example, again using the example where kernel K1 is operating on core 302_2, Path_8 corresponds to the output data of kernel K1 being forwarded to core 302_6.

Each of the paths listed in table 501 have an associated weight which corresponds to the multiple of the nodal hop distance and the size of the image data that is being transferred along the connection. In the case of the K1 to K2 connection, from the depiction of the application software program in FIG. 4, the image data has a size of 4.0. Therefore, each nodal hop distance of a particular path that is listed in FIG. 4 is multiplied by 4.0 to determine the total weight for the path. The K1→K2 table 501 therefore lists the total weights for all possible paths from kernel K1 to the various other cores within the processor that K1 can send its data to.

Continuing then, with the K1→K2 table 501 describing the different possible paths for the K1→K2 connection, FIG. 5 further demonstrates the next level of analysis performed by the affinity mapper for one of these paths. Here, the K2→K3_1 table 502 shows the remaining available connections that may be used for the K2→K3_1 connection (the sending of K2's output data to the K3_1 kernel) for Path_1 from the K1→K2 table 501. Recalling from above that Path_1 corresponds to the configuration where K1 forwards its output data to a core that neighbors the core that is executing kernel K1, the K2→K3_1 table 502 shows the remaining path options if this specific configuration is at play.

Here, note that the K2→K3_1 table 502 has only one path, Path_11, having a nodal hop of 1. This is a consequence of one of the cores that corresponds to a nodal hop of 1 being already consumed executing kernel K1 and is therefore not available to receive data from kernel K2 (the instant example is assuming different kernels will execute on different cores). Said another way, the purpose of the specific K2→K3_1 table 502 of FIG. 5 is to effectively place kernel K3_1 on an available core recognizing that the core that kernel K1 is executing on is not available.

Here, Path_11 corresponds to kernel K3_1 being placed on the one remaining available core that immediately neighbors the core that kernel K2 is executing on. Again, recalling the example for Path_1 where kernel K1 executes on core 302_2 of FIG. 3 and kernel K1 forwards its output data to kernel K2 which operations on core 301_2, Path_11 corresponds to kernel K2 sending its output data to core 301_3 where K3_1 operates. Likewise, Path_12 and Path_13 correspond to K3_1 operating on one of the cores that is two hops away from the core that core K2 operates. Again, recognizing that Path_1 of FIG. 5 corresponds, e.g., to kernel K1 operating on core 302_1 and kernel K2 operating on core 302_2, Path_12 may correspond to kernel K3_1 operating on core 302_4 and Path_13 may correspond to kernel K3_1 operating on core 302_8. The remaining paths Path_14 through Path_16 show the corresponding nodal hops as the core that kernel K3_1 operates on moves farther away from the core that kernel K2 operates on around the network ring. Note from FIG. 4 that the K2 to K3_1 connection maintains an image size of 1.0, and, as such, each of the paths of table 501 have a total weight that is equal to the nodal hop distance (the nodal hop distance is factored by unity to determine the total weight of the path).

Here, each unique path name corresponds to a unique path through the processor. Because all the paths listed in the K2→K3 table 502 emanate from Path_1 of the K1→K2 table 501, each of the paths listed in the K2→K3_1 table 502 necessarily include kernel K1 forwarding its output data to one of its neighboring core where K2 operates. Path_11 may therefore be defined to include not only this connection but also a connection to the only remaining available core that immediately neighbors the core that K2 operates on. Likewise, Path_12 may be defined to include the K1 to K2 single hop connection and a connection to one of the cores that is two hops away from K2's core (and Path_12 defined to be to the other of such cores). Note that which specific core K1 operates on need not be explicitly defined as the configuration can be defined as offsets from the position of K1's core on the ring (whichever core it ends up to be).

The K2→K3_1 table 502 observed in FIG. 5 only shows available connections when Path_1 of table 501 is at play. In various embodiments, the affinity mapper performs a similar next analysis for each of the paths listed in the K1→K2 table 501. That is, noting that the K1→K2 table 501 lists seven different paths, the affinity mapper would effectively calculate seven tables like the K2→K3_1 table 502. These tables, however, would contain comparatively varied nodal hop and weight values to reflect their different corresponding base paths reflected in table 501. For example, the K2→K3_1 table 502 contains only one 1.0 nodal hop listing because a core that neighbors the core that K2 is operating on is not available to consume K2's data (because K1 is operating on it). However, two 1.0 nodal hop listings would be available for any next table generated from any of the paths of the K1→K2 table 501 other than Path_1.

FIG. 6 shows an example of deeper, next level calculations performed by the affinity mapper that apply when Path_11 of FIG. 5 is in play. Here, recall that Path_11 corresponds to a configuration where K1 forwards its output data to one of its immediately neighboring cores (where K2 operates) and K2 forwards its output data to the only remaining available neighboring core (where K3_1 operates). For example, if K1 operates on core 302_2 of FIG. 3 and K2 operates on core 302_3 then Path_11 necessarily includes K3_1 operating on core 302_4. The next level of calculation, depicted as the K2→K3_2 table 601 of FIG. 6, determines to which core K2 will forward its data for consumption by K3_2 if Path_11 is in play. Referring to table 601, note that no paths having a nodal hop of 1.0 are available. Here, under the configuration of Path_11, both of the cores that neighbor K2's core are being utilized (one to execute K1 and the other to execute K3_1). As such, the closest cores are 2.0 nodal hops away. The total weights of the table 601 are also factored by unity because, from FIG. 4, the size of the image frames that are sent from kernel K2 to kernel K3_2 are also 1.0.

The K3_1→K4 table 602 lists the possible paths and associated total weights if Path_112 of the K2→K3_2 path of table 601 is in play. Here, Path_112 corresponds to a configuration in which K1 and K3_1 operate on cores that immediately neighbor K2's core and K3_2 operates on a core that immediately neighbors K1's core or that immediately neighbors K3_1's core. Assuming Path_112 corresponds to a configuration in which K3_2 operates on the core that is next to KVs core, K4 will have four remaining cores upon which to operate on, one core that is one hop away from K3_1's core, one core that is two hops away from K3_1's core, one core that is three hops away from K3_1's core and one core that is four hops away from K3_1's core. For example, if K1 operates on core 302_2, K2 operates on core 302_3, K3_1 operates on core 302_4 and K3_2 operates on core 302_1, K4 could be placed on any of cores 302_5, 302_6, 302_7, 302_8 which are 1.0, 2.0, 3.0 and 4.0 nodal hops away respectively from K3_1's core (302_4). Table 604 reflects these options with appropriate weights. Placing K4 completes the kernel to core mapping for the application structure of FIG. 4.

Note that passing down through each level of calculations from FIG. 5 through FIG. 6 the number of available paths continually decreases reflecting the existing commitment of cores to the particular configuration represented by the thread of continually deeper calculations. Again, in various embodiments, the affinity mapper explores/calculates all levels from all possible connections. Each thread of unique calculations through the various levels corresponds to a different configuration of particular kernels on particular cores. Each thread accumulates the total weight along its particular set of selected paths which results in a final weight for the complete thread/configuration. The thread with the lowest total weight is selected as the configuration of the application software program for the processor.

In various embodiments, after the kernel to core mappings have been defined, buffers (queues) are allocated onto the line buffer units. Recall from the discussion of FIGS. 2 and 3 that a line buffer unit receives, e.g., line groups of image data sent from a producing kernel and queues the line groups before forwarding them to the consuming kernel. Here, the queuing for a single producer/consumer connection may be referred to as a "buffer". A buffer has an associated amount of line buffer unit memory space that it consumes in order to implement its corresponding queue. Here, a single line buffer unit can be configured to implement multiple buffers. In an embodiment, each of the line buffer units have a limited amount of memory space such that the total size of all buffers that are allocated to a particular line buffer unit should fit within the line buffer unit's memory resources.

In an embodiment, each buffer in the application software program and its corresponding memory consumption footprint is defined. Then, for each buffer, the mapping algorithm builds a list of line buffer units sorted by the distance to the buffer's producing core (here, the line buffer unit that is closest to the buffer's producing kernel's core is listed first and the line buffer unit that is farthest from the buffer's producing kernel's core is listed last). The algorithm then allocates the buffer to the highest ranked line buffer unit on the list that has memory space to accommodate the buffer. The mapping algorithm processes each buffer in series according to this process until all buffers have been considered and allocated to a line buffer unit.

The kernel mapping and buffer allocation may be performed, e.g., by a compiler that compiles higher level application software program code into lower level object (executable) program code. The compiler calculates the total weights of, e.g., all possible threads representing all possible internal kernel configurations and connections so that the lowest thread/configuration can be identified, and, defines which buffers are allocated on which line buffer units. By so doing, the compiler will have identified to which particular line buffer unit(s) each producing kernel on a particular core is to send its output data and to which consuming kernel(s) on which core(s) each line buffer unit is to forward its queued data to. The identification includes an articulation of which kernels are to be executed on which cores (or at least positional offsets of the kernels from one another). The chosen configuration is recorded, e.g., in meta-data that accompanies the compiled application software. The meta-data is then used to, e.g., enter specific values into the kernels and/or configuration register space of the processor to physically effect the selected configuration, as part of the loading of the loading of the application software program on the image processor for execution.

Although the above described approach of FIGS. 5 and 6 have been directed to assigning a weight for a kernel-to-kernel connection that ignores the presence of a line buffer unit that stores and forwards the data over the course of the connection, other embodiments may be further granularized such that a producing kernel to line buffer unit weight is determined and a line buffer unit to consuming kernel weight is determined for a kernel-to-kernel connection. The search space is significantly expanded with such an approach however as compared to the approach of FIGS. 5 and 6. Buffer allocations may also be assigned to such connections which may add to the search space overhead.

Although the discussion of FIGS. 5 and 6 have been directed to determining an application software program configuration for a hardware platform having the image processor architecture of FIG. 3, note that the teachings above can be applied to various other alternative embodiments. For example, the image processor implementation of FIG. 3 has equal numbers of line buffer units and cores. Other implementations may have different numbers of line buffer units and cores.

Further still, as discussed above, the line buffer units 301 forward groups of lines of an image. Alternative implementations need not necessarily receive and forward line groups specifically). Also, although the image processor of FIG. 3 includes a ring network 304, other types of networks may be used (e.g., a switched network, a traditional multi-drop bus, etc.). Even further, the cores need not include a respective sheet generator or stencil processor having two-dimensional execution lane array or two-dimensional shift register array.

Figure 7:
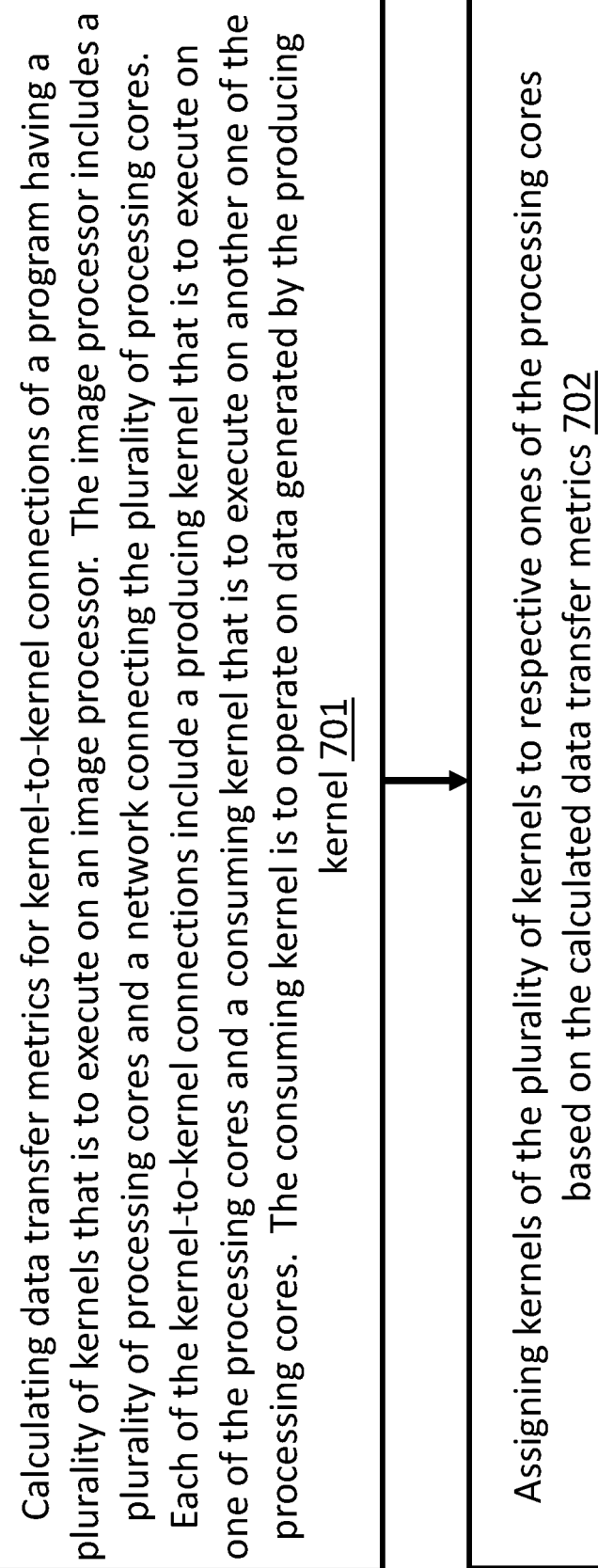
FIG. 7 shows a method for determining a configuration for an application software program to execute on an image processor.

FIG. 7 shows a method described above. The method includes calculating data transfer metrics for kernel-to-kernel connections of a program having a plurality of kernels that is to execute on an image processor 701. The image processor includes a plurality of processing cores and a network connecting the plurality of processing cores. Each of the kernel-to-kernel connections include a producing kernel that is to execute on one of the processing cores and a consuming kernel that is to execute on another one of the processing cores. The consuming kernel is to operate on data generated by the producing kernel. The method also includes assigning kernels of the plurality of kernels to respective ones of the processing cores based on the calculated data transfer metrics 702.

3.0 Image Processor Implementation Embodiments

FIGS. 8*a-e* through FIG. 12 provide additional details concerning operation and design of various embodiments for the image processor and associated stencil processor described at length above. Recalling from the discussion of FIG. 2 that a line buffer unit feeds line groups to a stencil processor's associated sheet generator, FIGS. 8*a* through 8*e* illustrate at a high level embodiments of both the parsing activity of a line buffer unit 201, the finer grained parsing activity of a sheet generator unit 203 as well as the stencil processing activity of the stencil processor that is coupled to the sheet generator unit 203.

Figure 8A:
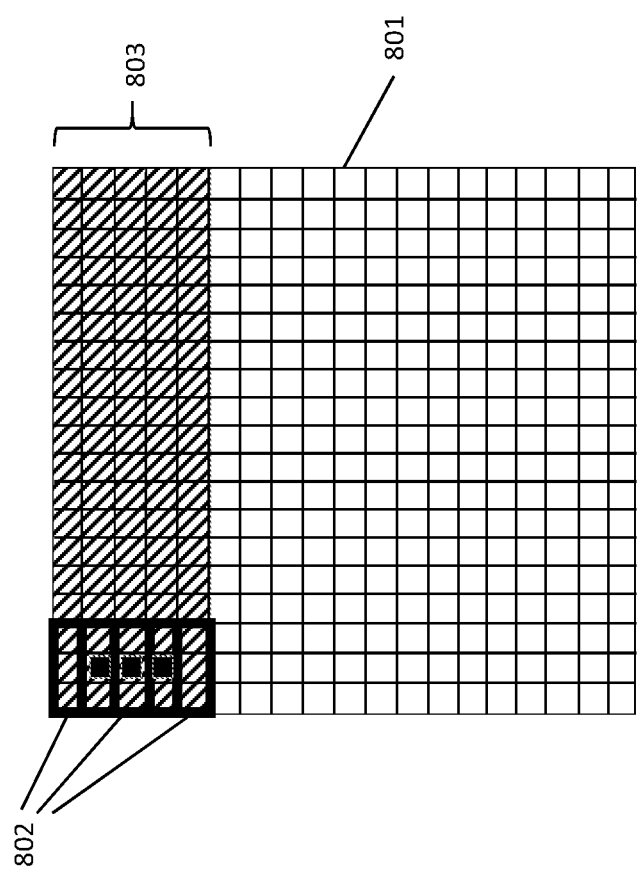
FIGS. 8a, 8b, 8c, 8d and 8e depict the parsing of image data into a line group, the parsing of a line group into a sheet and the operation performed on a sheet with overlapping stencils.

FIG. 8*a* depicts an embodiment of an input frame of image data 801. FIG. 8*a* also depicts an outline of three overlapping stencils 802 (each having a dimension of 3 pixels×3 pixels) that a stencil processor is designed to operate over. The output pixel that each stencil respectively generates output image data for is highlighted in solid black. For simplicity, the three overlapping stencils 802 are depicted as overlapping only in the vertical direction. It is pertinent to recognize that in actuality a stencil processor may be designed to have overlapping stencils in both the vertical and horizontal directions.

Because of the vertical overlapping stencils 802 within the stencil processor, as observed in FIG. 8*a*, there exists a wide band of image data within the frame that a single stencil processor can operate over. As will be discussed in more detail below, in an embodiment, the stencil processors process data within their overlapping stencils in a left to right fashion across the image data (and then repeat for the next set of lines, in top to bottom order). Thus, as the stencil processors continue forward with their operation, the number of solid black output pixel blocks will grow right-wise horizontally. As discussed above, a line buffer unit 201 is responsible for parsing a line group of input image data from an incoming frame that is sufficient for the stencil processors to operate over for an extended number of upcoming cycles. An exemplary depiction of a line group is illustrated as a shaded region 803. In an embodiment, the line buffer unit 201 can comprehend different dynamics for sending/receiving a line group to/from a sheet generator. For example, according to one mode, referred to as "full group", the complete full width lines of image data are passed between a line buffer unit and a sheet generator. According to a second mode, referred to as "virtually tall", a line group is passed initially with a subset of full width rows. The remaining rows are then passed sequentially in smaller (less than full width) pieces.

With the line group 803 of the input image data having been defined by the line buffer unit and passed to the sheet generator unit, the sheet generator unit further parses the line group into finer sheets that are more precisely fitted to the hardware limitations of the stencil processor. More specifically, as will be described in more detail further below, in an embodiment, each stencil processor consists of a two dimensional shift register array. The two dimensional shift register array essentially shifts image data "beneath" an array of execution lanes where the pattern of the shifting causes each execution lane to operate on data within its own respective stencil (that is, each execution lane processes on its own stencil of information to generate an output for that stencil). In an embodiment, sheets are surface areas of input image data that "fill" or are otherwise loaded into the two dimensional shift register array.

As will be described in more detail below, in various embodiments, there are actually multiple layers of two dimensional register data that can be shifted on any cycle. For convenience, much of the present description will simply use the term "two-dimensional shift register" and the like to refer to structures that have one or more such layers of two-dimensional register data that can be shifted.

Figure 8B:
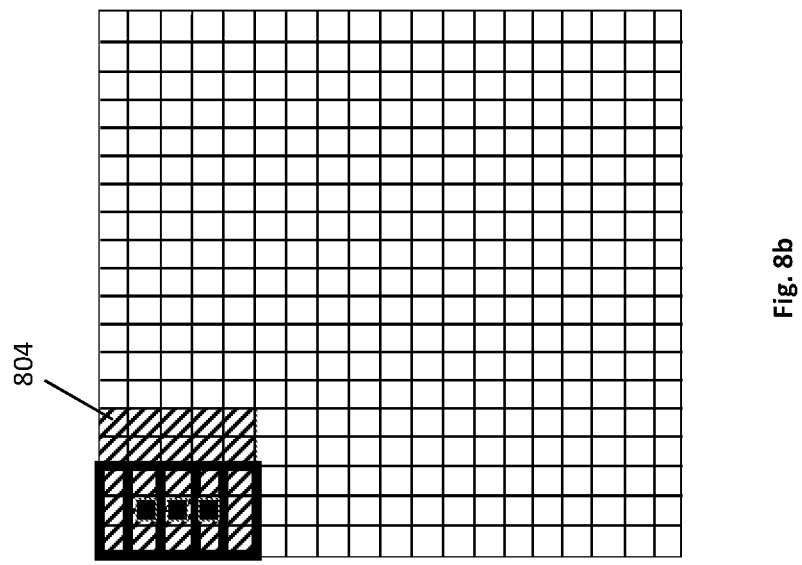
Figure 8C:
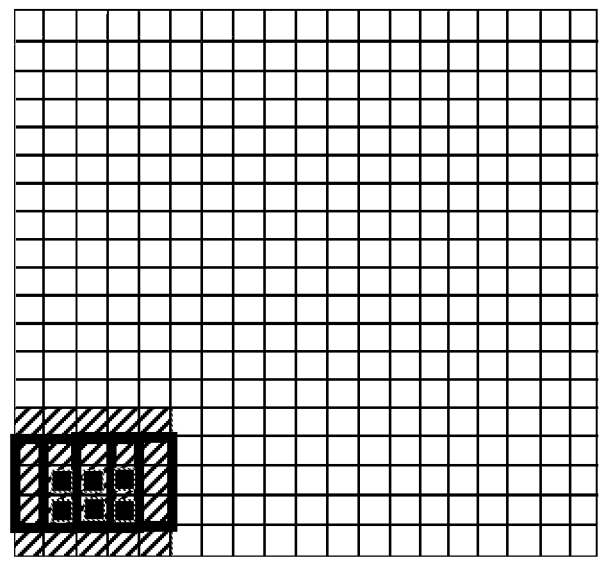
Figure 8D:
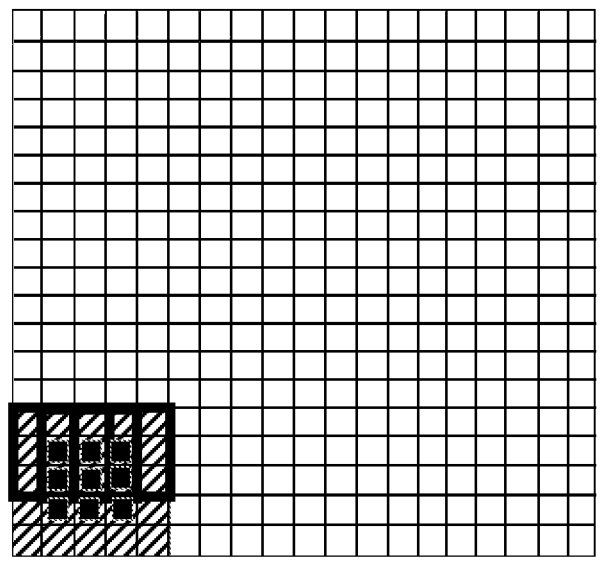

Thus, as observed in FIG. 8b, the sheet generator parses an initial sheet 804 from the line group 803 and provides it to the stencil processor (here, the sheet of data corresponds to the shaded region that is generally identified by reference number 804). As observed in FIGS. 8c and 8d, the stencil processor operates on the sheet of input image data by effectively moving the overlapping stencils 802 in a left to right fashion over the sheet. As of FIG. 8d, the number of pixels for which an output value could be calculated from the data within the sheet is exhausted (no other pixel positions can have an output value determined from the information within the sheet). For simplicity the border regions of the image have been ignored.

Figure 8E:
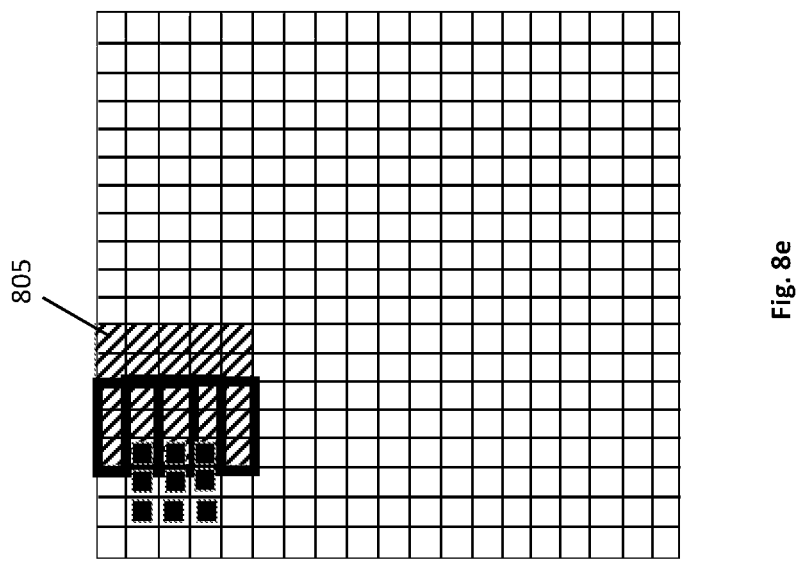

As observed in FIG. 8e the sheet generator then provides a next sheet 805 for the stencil processor to continue operations on. Note that the initial positions of the stencils as they begin operation on the next sheet is the next progression to the right from the point of exhaustion on the first sheet (as depicted previously in FIG. 8d). With the new sheet 805, the stencils will simply continue moving to the right as the stencil processor operates on the new sheet in the same manner as with the processing of the first sheet.

Note that there is some overlap between the data of the first sheet 804 and the data of the second sheet 805 owing to the border regions of stencils that surround an output pixel location. The overlap could be handled simply by the sheet generator re-transmitting the overlapping data twice. In alternate implementations, to feed a next sheet to the stencil processor, the sheet generator may proceed to only send new data to the stencil processor and the stencil processor reuses the overlapping data from the previous sheet.

Figure 9A:
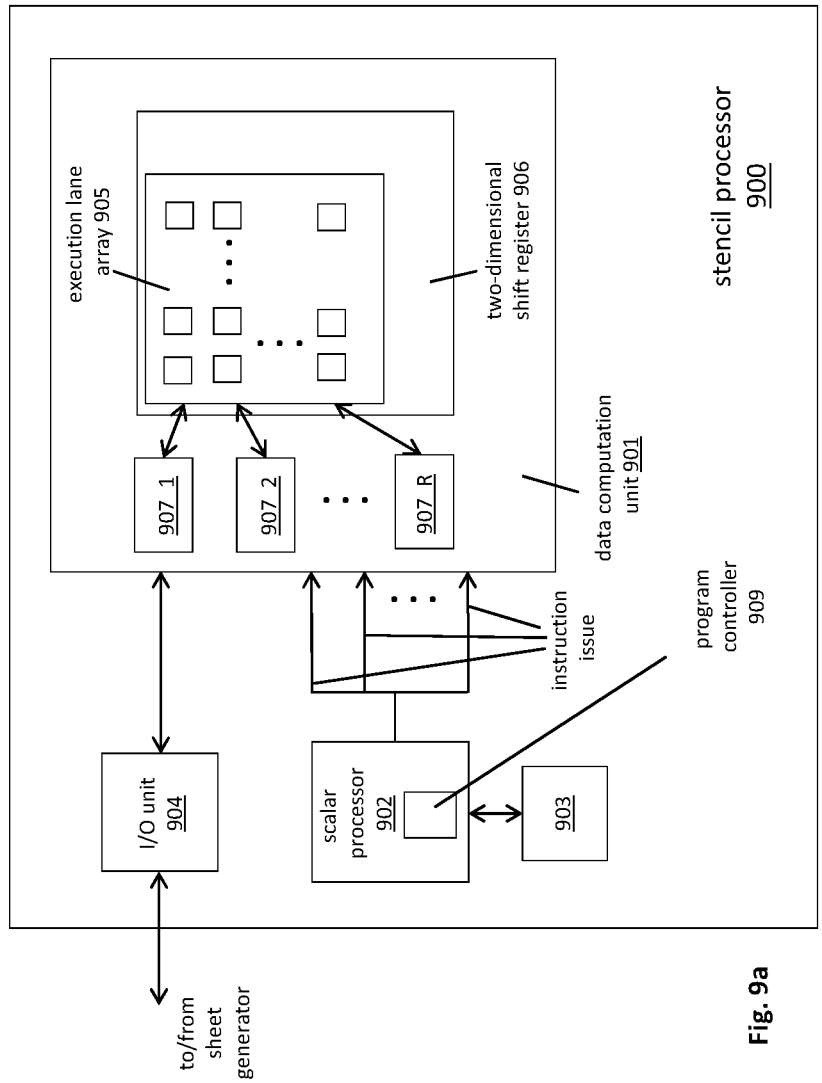
FIG. 9a shows an embodiment of a stencil processor.

FIG. 9 shows an embodiment of a stencil processor architecture 900. As observed in FIG. 9, the stencil processor includes a data computation unit 901, a scalar processor 902 and associated memory 903 and an I/O unit 904. The data computation unit 901 includes an array of execution lanes 905, a two-dimensional shift array structure 906 and separate random access memories 907 associated with specific rows or columns of the array.

The I/O unit 904 is responsible for loading "input" sheets of data received from the sheet generator into the data computation unit 901 and storing "output" sheets of data from the stencil processor into the sheet generator. In an embodiment the loading of sheet data into the data computation unit 901 entails parsing a received sheet into rows/columns of image data and loading the rows/columns of image data into the two dimensional shift register structure 906 or respective random access memories 907 of the rows/columns of the execution lane array (described in more detail below). If the sheet is initially loaded into memories 907, the individual execution lanes within the execution lane array 905 may then load sheet data into the two-dimensional shift register structure 906 from the random access memories 907 when appropriate (e.g., as a load instruction just prior to operation on the sheet's data). Upon completion of the loading of a sheet of data into the register structure 906 (whether directly from a sheet generator or from memories 907), the execution lanes of the execution lane array 905 operate on the data and eventually "write back" finished data as a sheet directly back to the sheet generator, or, into the random access memories 907. If the later the I/O unit 904 fetches the data from the random access memories 907 to form an output sheet which is then forwarded to the sheet generator.

The scalar processor 902 includes a program controller 909 that reads the instructions of the stencil processor's program code from scalar memory 903 and issues the instructions to the execution lanes in the execution lane array 905. In an embodiment, a single same instruction is broadcast to all execution lanes within the array 905 to effect a SIMD-like behavior from the data computation unit 901. In an embodiment, the instruction format of the instructions read from scalar memory 903 and issued to the execution lanes of the execution lane array 905 includes a very-long-instruction-word (VLIW) type format that includes more than one opcode per instruction. In a further embodiment, the VLIW format includes both an ALU opcode that directs a mathematical function performed by each execution lane's ALU (which, as described below, in an embodiment may specify more than one traditional ALU operation) and a memory opcode (that directs a memory operation for a specific execution lane or set of execution lanes).

The term "execution lane" refers to a set of one or more execution units capable of executing an instruction (e.g., logic circuitry that can execute an instruction). An execution lane can, in various embodiments, include more processor-like functionality beyond just execution units, however. For example, besides one or more execution units, an execution lane may also include logic circuitry that decodes a received instruction, or, in the case of more MIMD-like designs, logic circuitry that fetches and decodes an instruction. With respect to MIMD-like approaches, although a centralized program control approach has largely been described herein, a more distributed approach may be implemented in various alternative embodiments (e.g., including program code and a program controller within each execution lane of the array 905).

The combination of an execution lane array 905, program controller 909 and two dimensional shift register structure 906 provides a widely adaptable/configurable hardware platform for a broad range of programmable functions. For example, application software developers are able to program kernels having a wide range of different functional capability as well as dimension (e.g., stencil size) given that the individual execution lanes are able to perform a wide variety of functions and are able to readily access input image data proximate to any output array location.

Apart from acting as a data store for image data being operated on by the execution lane array 905, the random access memories 907 may also keep one or more look-up tables. In various embodiments one or more scalar look-up tables may also be instantiated within the scalar memory 903.

A scalar look-up involves passing the same data value from the same look-up table from the same index to each of the execution lanes within the execution lane array 905. In various embodiments, the VLIW instruction format described above is expanded to also include a scalar opcode that directs a look-up operation performed by the scalar processor into a scalar look-up table. The index that is specified for use with the opcode may be an immediate operand or fetched from some other data storage location. Regardless, in an embodiment, a look-up from a scalar look-up table within scalar memory essentially involves broadcasting the same data value to all execution lanes within the execution lane array 905 during the same clock cycle. Additional details concerning use and operation of look-up tables is provided further below.

FIG. 9b summarizes the VLIW instruction word embodiments(s) discussed above. As observed in FIG. 9b, the VLIW instruction word format includes fields for three separate instructions: 1) a scalar instruction 951 that is executed by the scalar processor; 2) an ALU instruction 952 that is broadcasted and executed in SIMD fashion by the respective ALUs within the execution lane array; and, 3) a memory instruction 953 that is broadcasted and executed in a partial SIMD fashion (e.g., if execution lanes along a same row in the execution lane array share a same random access memory, then one execution lane from each of the different rows actually execute the instruction (the format of the memory instruction 953 may include an operand that identifies which execution lane from each row executes the instruction).

A field 954 for one or more immediate operands is also included. Which of the instructions 951, 952, 953 use which immediate operand information may be identified in the instruction format. Each of instructions 951, 952, 953 also include their own respective input operand and resultant information (e.g., local registers for ALU operations and a local register and a memory address for memory access instructions). In an embodiment, the scalar instruction 951 is executed by the scalar processor before the execution lanes within the execution lane array execute either of the other to instructions 952, 953. That is, the execution of the VLIW word includes a first cycle upon which the scalar instruction 951 is executed followed by a second cycle upon with the other instructions 952, 953 may be executed (note that in various embodiments instructions 952 and 953 may be executed in parallel).

In an embodiment, the scalar instructions executed by the scalar processor include commands issued to the sheet generator to load/store sheets from/into the memories or 2D shift register of the data computation unit. Here, the sheet generator's operation can be dependent on the operation of the line buffer unit or other variables that prevent pre-runtime comprehension of the number of cycles it will take the sheet generator to complete any command issued by the scalar processor. As such, in an embodiment, any VLIW word whose scalar instruction 951 corresponds to or otherwise causes a command to be issued to the sheet generator also includes no-operation (NOOP) instructions in the other two instruction field 952, 953. The program code then enters a loop of NOOP instructions for instruction fields 952, 953 until the sheet generator completes its load/store to/from the data computation unit. Here, upon issuing a command to the sheet generator, the scalar processor may set a bit of an interlock register that the sheet generator resets upon completion of the command. During the NOOP loop the scalar processor monitors the bit of the interlock bit. When the scalar processor detects that the sheet generator has completed its command normal execution begins again.

Figure 10:
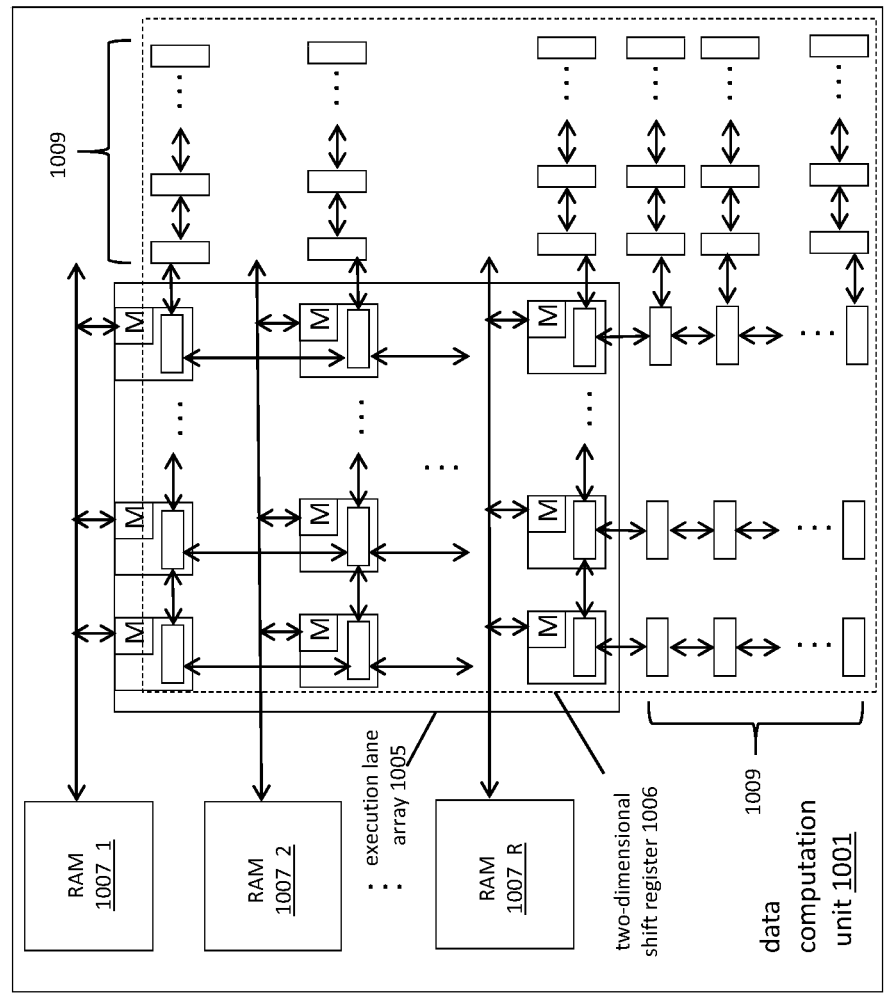
FIG. 10 shows an embodiment of a data computation unit within a stencil processor.

FIG. 10 shows an embodiment of a data computation component 1001. As observed in FIG. 10, the data computation component 1001 includes an array of execution lanes 1005 that are logically positioned "above" a two-dimensional shift register array structure 1006. As discussed above, in various embodiments, a sheet of image data provided by a sheet generator is loaded into the two-dimensional shift register 1006. The execution lanes then operate on the sheet data from the register structure 1006.

The execution lane array 1005 and shift register structure 1006 are fixed in position relative to one another. However, the data within the shift register array 1006 shifts in a strategic and coordinated fashion to cause each execution lane in the execution lane array to process a different stencil within the data. As such, each execution lane determines the output image value for a different pixel in the output sheet being generated. From the architecture of FIG. 10 it should be clear that overlapping stencils are not only arranged vertically but also horizontally as the execution lane array 1005 includes vertically adjacent execution lanes as well as horizontally adjacent execution lanes.

Some notable architectural features of the data computation unit 1001 include the shift register structure 1006 having wider dimensions than the execution lane array 1005. That is, there is a "halo" of registers 1009 outside the execution lane array 1005. Although the halo 1009 is shown to exist on two sides of the execution lane array, depending on implementation, the halo may exist on less (one) or more (three or four) sides of the execution lane array 1005. The halo 1005 serves to provide "spill-over" space for data that spills outside the bounds of the execution lane array 1005 as the data is shifting "beneath" the execution lanes 1005. As a simple case, a 5x5 stencil centered on the right edge of the execution lane array 1005 will need four halo register locations further to the right when the stencil's leftmost pixels are processed. For ease of drawing, FIG. 10 shows the registers of the right side of the halo as only having horizontal shift connections and registers of the bottom side of the halo as only having vertical shift connections when, in a nominal embodiment, registers on either side (right, bottom) would have both horizontal and vertical connections. In various embodiments, the halo region does not include corresponding execution lane logic to execute image processing instructions (e.g., no ALU is present). However, individual memory access units (M) are present in each of the halo region locations so that the individual halo register locations can individually load data from memory and store data to memory.

Additional spill-over room is provided by random access memories 1007 that are coupled to each row and/or each column in the array, or portions thereof (E.g., a random access memory may be assigned to a "region" of the execution lane array that spans 4 execution lanes row wise and 2 execution lanes column wise. For simplicity the remainder of the application will refer mainly to row and/or column based allocation schemes). Here, if a execution lane's kernel operations require it to process pixel values outside of the two-dimensional shift register array 1006 (which some image processing routines may require) the plane of image data is able to further spill-over, e.g., from the halo region 1009 into random access memory 1007. For example, consider a 6x6 stencil where the hardware includes a halo region of only four storage elements to the right of a execution lane on the right edge of the execution lane array. In this case, the data would need to be shifted further to the right off the right edge of the halo 1009 to fully process the stencil. Data that is shifted outside the halo region 1009 would then spill-over to random access memory 1007. Other applications of the random access memories 1007 and the stencil processor of FIG. 9 are provided further below.

FIGS. 11*a* through 11*k* demonstrate a working example of the manner in which image data is shifted within the two dimensional shift register array "beneath" the execution lane array as alluded to above. As observed in FIG. 11*a*, the data contents of the two dimensional shift array are depicted in a first array 1107 and the execution lane array is depicted by a frame 1105. Also, two neighboring execution lanes 1110 within the execution lane array are simplistically depicted. In this simplistic depiction 1110, each execution lane includes a register R1 that can accept data from the shift register, accept data from an ALU output (e.g., to behave as an accumulator across cycles), or write output data into an output destination.

Each execution lane also has available, in a local register R2, the contents "beneath" it in the two dimensional shift array. Thus, R1 is a physical register of the execution lane while R2 is a physical register of the two dimensional shift register array. The execution lane includes an ALU that can operate on operands provided by R1 and/or R2. As will be described in more detail further below, in an embodiment the shift register is actually implemented with multiple (a "depth" of) storage/register elements per array location but the shifting activity is limited to one plane of storage elements (e.g., only one plane of storage elements can shift per cycle). FIGS. 11*a* through 11*k* depict one of these deeper register locations as being used to store the resultant X from the respective execution lanes. For illustrative ease the deeper resultant register is drawn alongside rather than beneath its counterpart register R2.

FIGS. 11*a* through 11*k* focus on the calculation of two stencils whose central position is aligned with the pair of execution lane positions 1111 depicted within the execution lane array. For ease of illustration, the pair of execution lanes 1110 are drawn as horizontal neighbors when in fact, according to the following example, they are vertical neighbors.

Figure 11A:
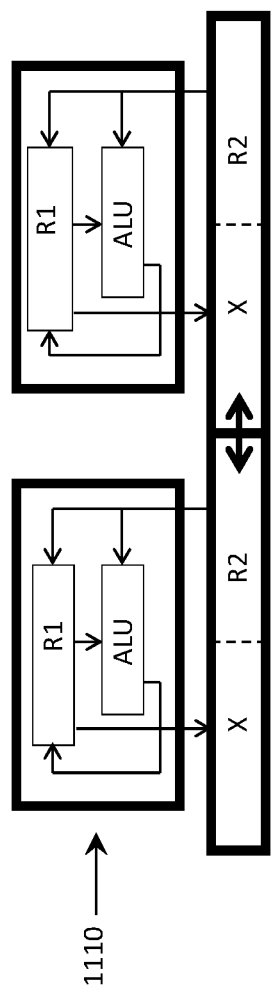
FIGS. 11a, 11b, 11c, 11d, 11e,11f, 11g, 11h, 11i, 11j and 11k depict an example of the use of a two-dimensional shift array and an execution lane array to determine a pair of neighboring output pixel values with overlapping stencils.
Figure 11A:
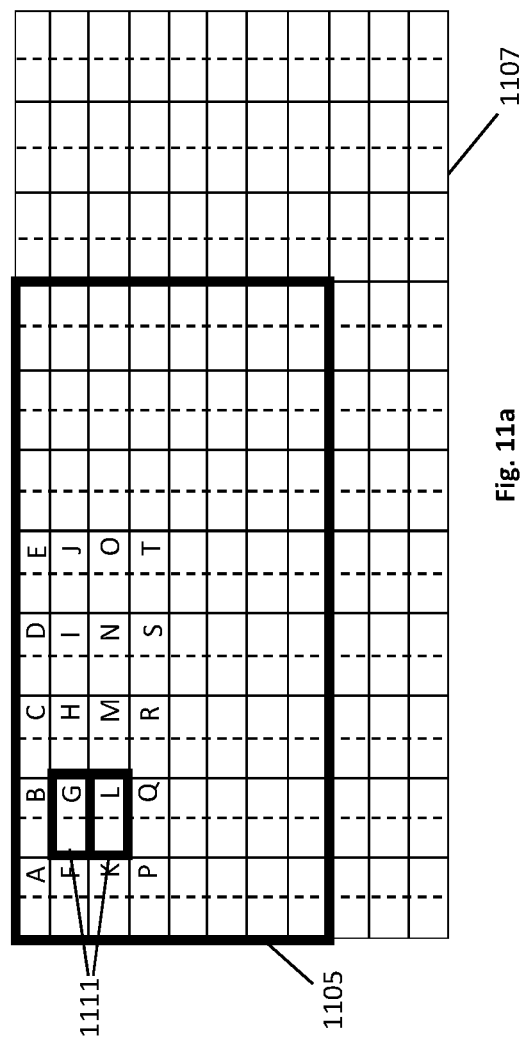
Figure 11B:
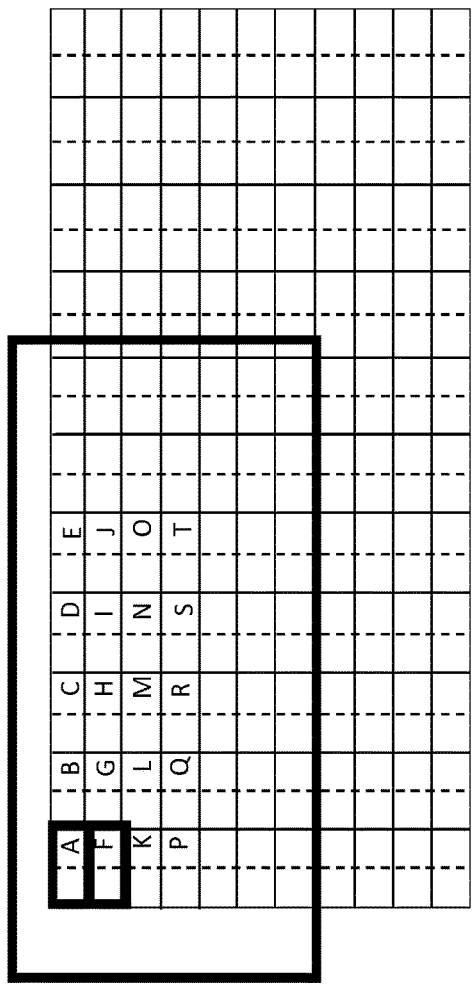

As observed initially in FIG. 11*a*, the execution lanes are centered on their central stencil locations. FIG. 11*b* shows the object code executed by both execution lanes. As observed in FIG. 11*b* the program code of both execution lanes causes the data within the shift register array to shift down one position and shift right one position. This aligns both execution lanes to the upper left hand corner of their respective stencils. The program code then causes the data that is located (in R2) in their respective locations to be loaded into R1.

Figure 11C:
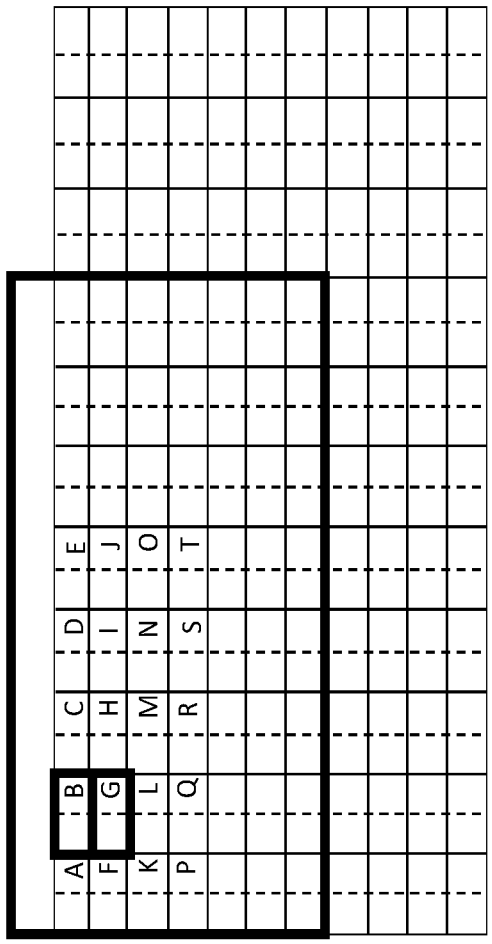
Figure 11D:
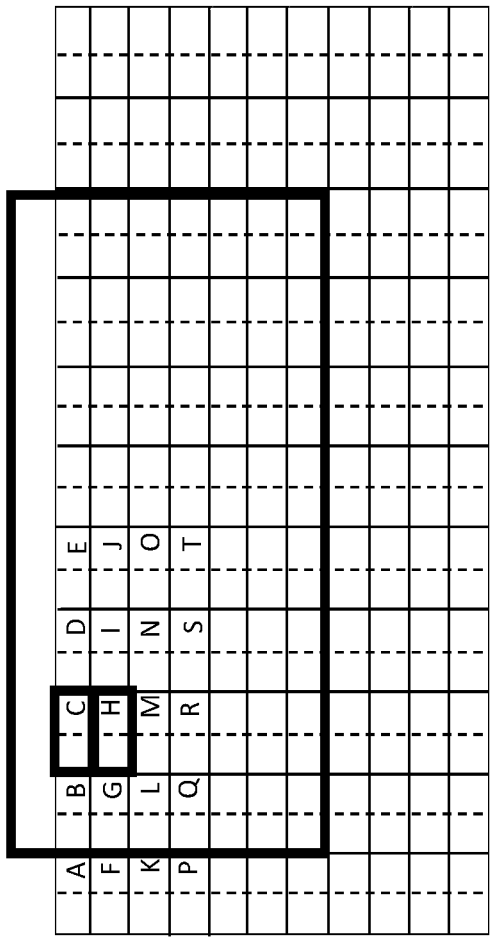

As observed in FIG. 11*c* the program code next causes the pair of execution lanes to shift the data within the shift register array one unit to the left which causes the value to the right of each execution lane's respective position to be shifted into each execution lane' position. The value in R1 (previous value) is then added with the new value that has shifted into the execution lane's position (in R2). The resultant is written into R1. As observed in FIG. 11*d* the same process as described above for FIG. 11*c* is repeated which causes the resultant R1 to now include the value A+B+C in the upper execution lane and F+G+H in the lower execution lane. At this point both execution lanes have processed the upper row of their respective stencils. Note the spill-over into a halo region on the left side of the execution lane array (if one exists on the left hand side) or into random access memory if a halo region does not exist on the left hand side of the execution lane array.

Figure 11E:
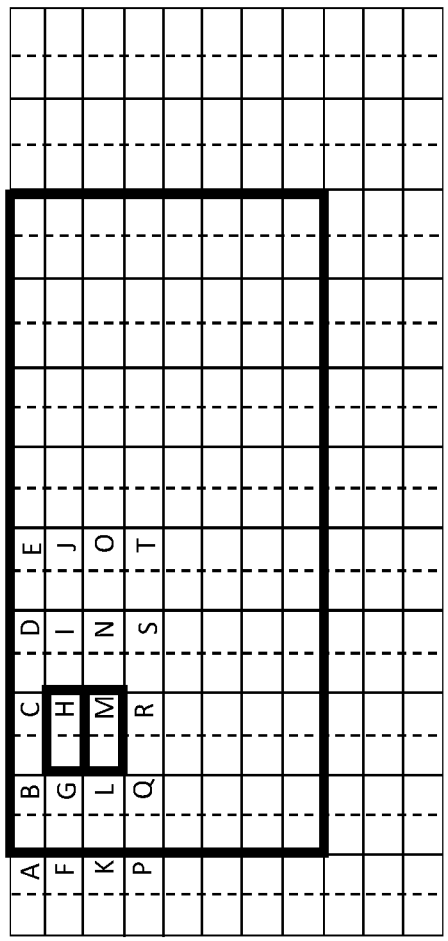
Figure 11F:
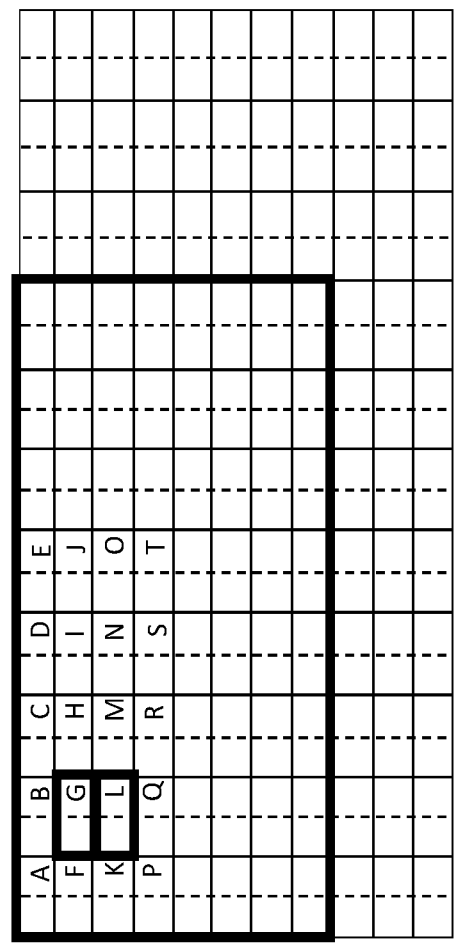
Figure 11G:
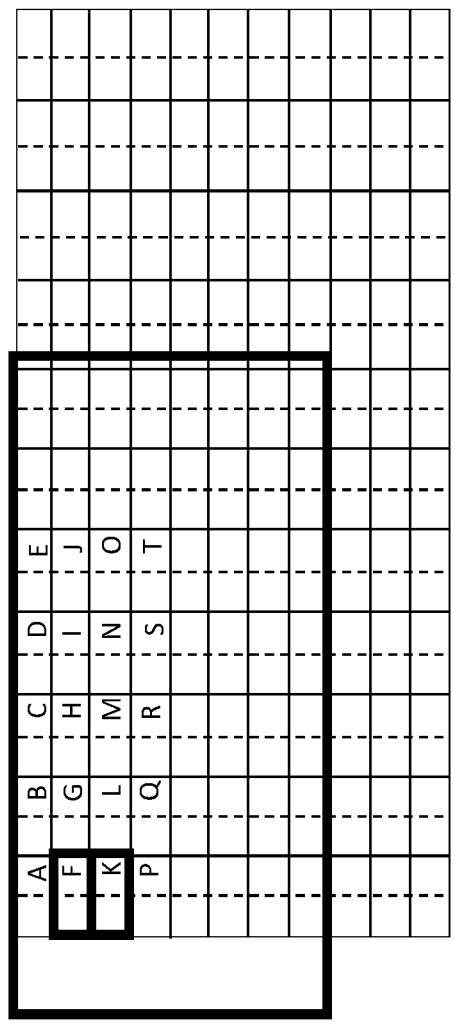

As observed in FIG. 11*e*, the program code next causes the data within the shift register array to shift one unit up which causes both execution lanes to be aligned with the right edge of the middle row of their respective stencils. Register R1 of both execution lanes currently includes the summation of the stencil's top row and the middle row's rightmost value. FIGS. 11*f* and 11*g* demonstrate continued progress moving leftwise across the middle row of both execution lane's stencils. The accumulative addition continues such that at the end of processing of FIG. 11*g* both execution lanes include the summation of the values of the top row and the middle row of their respective stencils.

Figure 11H:
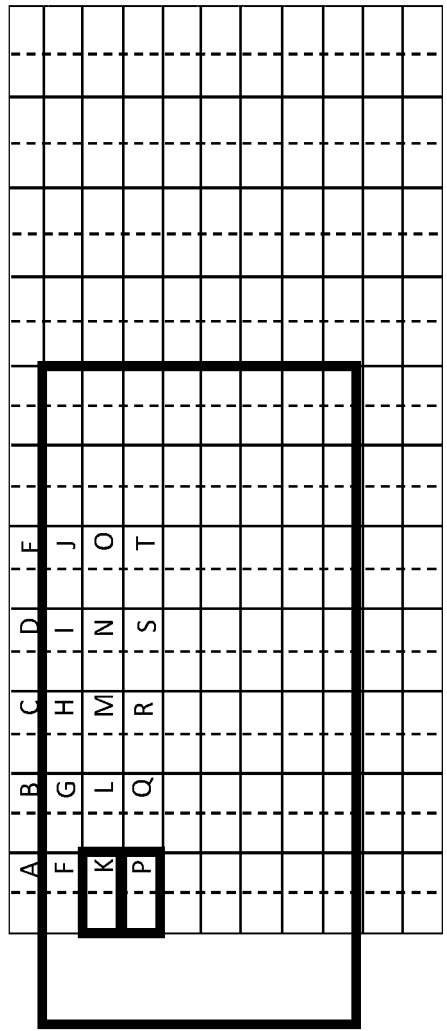
Figure 11I:
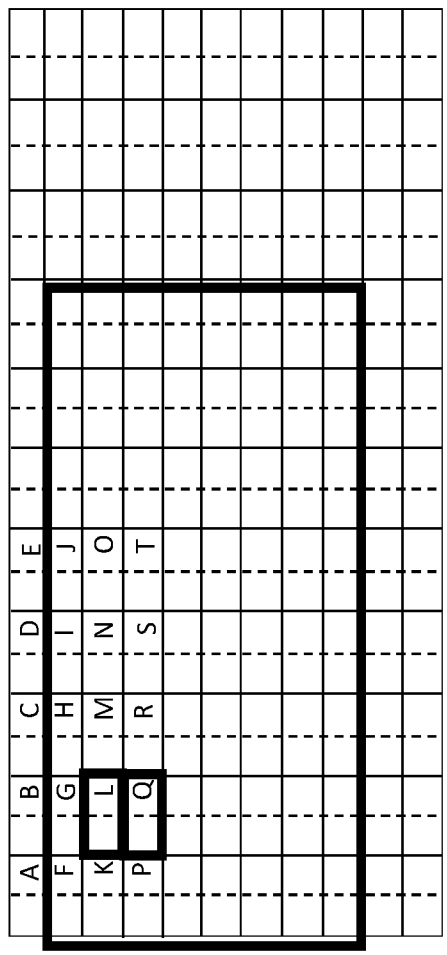
Figure 11J:
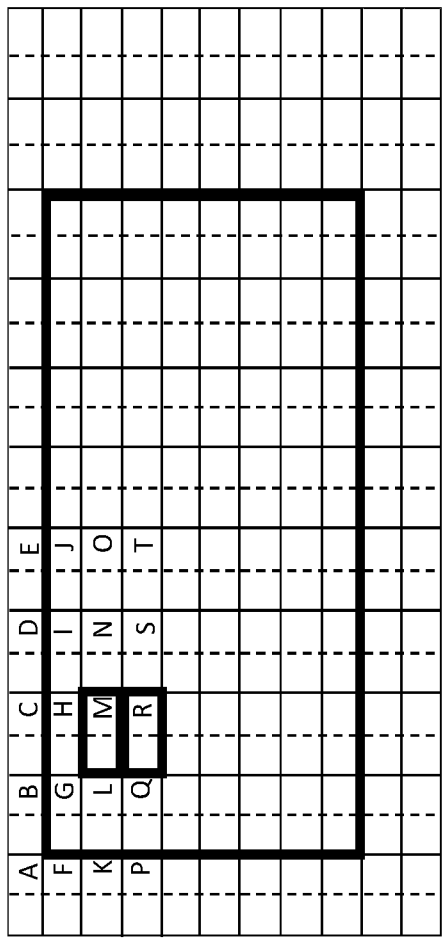
Figure 11K:
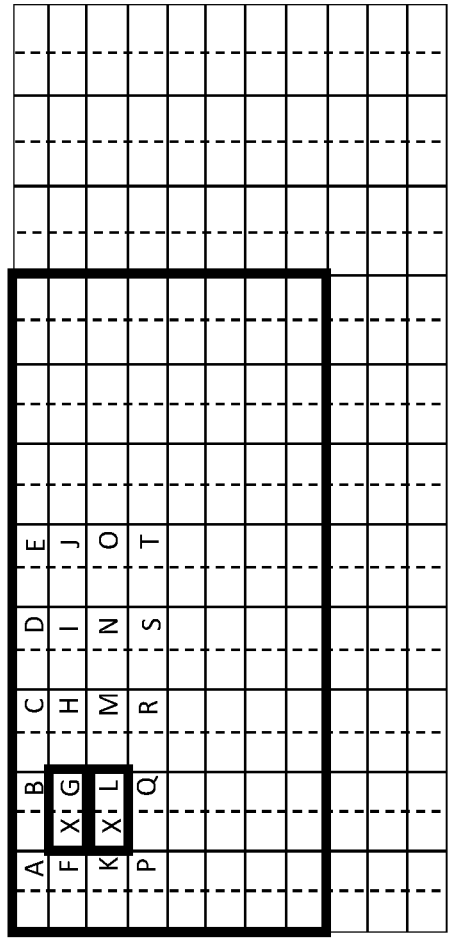

FIG. 11*h* shows another shift to align each execution lane with its corresponding stencil's lowest row. FIGS. 11*i* and 11*j* show continued shifting to complete processing over the course of both execution lanes' stencils. FIG. 11*k* shows additional shifting to align each execution lane with its correct position in the data array and write the resultant thereto.

In the example of FIGS. 11*a*-11*k* note that the object code for the shift operations may include an instruction format that identifies the direction and magnitude of the shift expressed in (X, Y) coordinates. For example, the object code for a shift up by one location may be expressed in object code as SHIFT 0, +1. As another example, a shift to the right by one location may expressed in object code as SHIFT +1, 0. In various embodiments shifts of larger magnitude may also be specified in object code (e.g., SHIFT 0, +2). Here, if the 2D shift register hardware only supports shifts by one location per cycle, the instruction may be interpreted by the machine to require multiple cycle execution, or, the 2D shift register hardware may be designed to support shifts by more than one location per cycle. Embodiments of the later are described in more detail further below.

Figure 12:
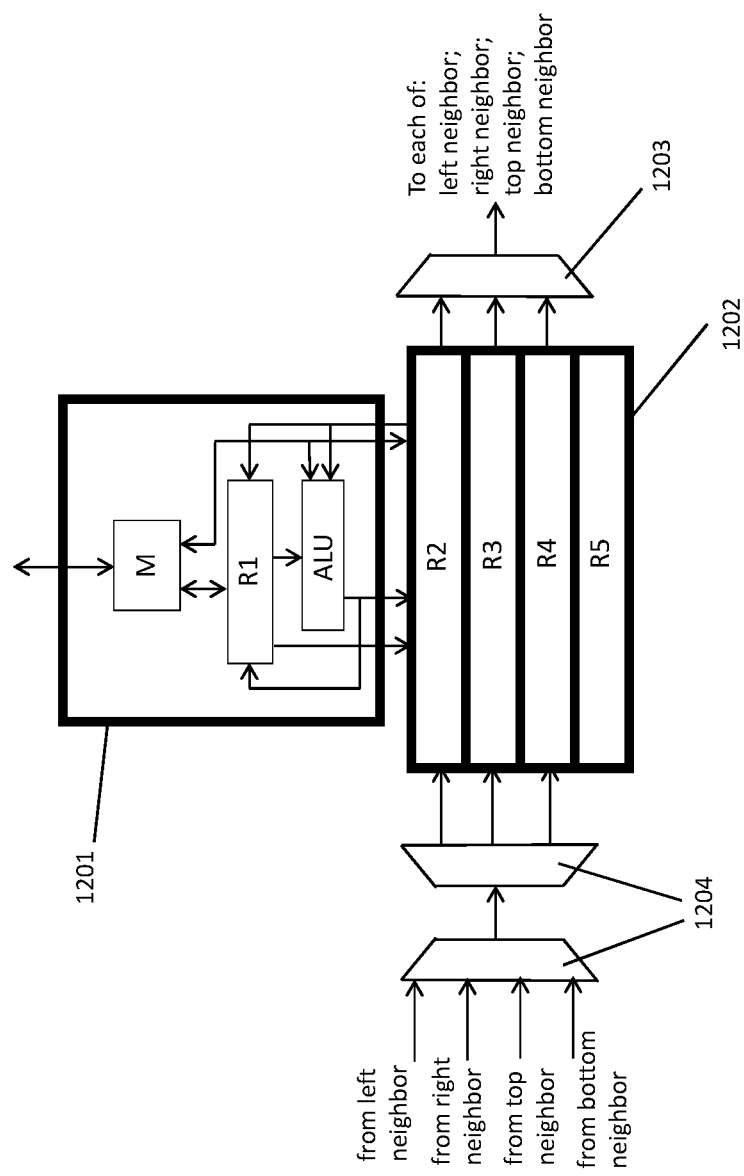
FIG. 12 shows an embodiment of a unit cell for an integrated execution lane array and two-dimensional shift array.

FIG. 12 shows another, more detailed depiction of the unit cell for an execution lane and corresponding shift register structure (registers in the halo region do not include a corresponding execution lane but do include a memory unit in various embodiments). The execution lane and the register space associated with each location in the execution lane array is, in an embodiment, implemented by instantiating the circuitry observed in FIG. 12 at each node of the execution lane array. As observed in FIG. 12, the unit cell includes a execution lane 1201 coupled to a register file 1202 consisting of four registers R2 through R5. During any cycle, the execution lane 1201 may read from or write to any of registers R1 through R5. For instructions requiring two input operands the execution lane may retrieve both of operands from any of R1 through R5.

In an embodiment, the two dimensional shift register structure is implemented by permitting, during a single cycle, the contents of any of (only) one of registers R2 through R4 to be shifted "out" to one of its neighbor's register files through output multiplexer 1203, and, having the contents of any of (only) one of registers R2 through R4 replaced with content that is shifted "in" from a corresponding one if its neighbors through input multiplexers 1204 such that shifts between neighbors are in a same direction (e.g., all execution lanes shift left, all execution lanes shift right, etc.). Although it may be common for a same register to have its contents shifted out and replaced with content that is shifted in on a same cycle, the multiplexer arrangement 1203, 1204 permits for different shift source and shift target registers within a same register file during a same cycle.

As depicted in FIG. 12 note that during a shift sequence a execution lane will shift content out from its register file 1202 to each of its left, right, top and bottom neighbors. In conjunction with the same shift sequence, the execution lane will also shift content into its register file from a particular one of its left, right, top and bottom neighbors. Again, the shift out target and shift in source should be consistent with a same shift direction for all execution lanes (e.g., if the shift out is to the right neighbor, the shift in should be from the left neighbor).

Although in one embodiment the content of only one register is permitted to be shifted per execution lane per cycle, other embodiments may permit the content of more than one register to be shifted in/out. For example, the content of two registers may be shifted out/in during a same cycle if a second instance of the multiplexer circuitry 1203, 1204 observed in FIG. 12 is incorporated into the design of FIG. 12. Of course, in embodiments where the content of only one register is permitted to be shifted per cycle, shifts from multiple registers may take place between mathematical operations by consuming more clock cycles for shifts between mathematical operations (e.g., the contents of two registers may be shifted between math ops by consuming two shift ops between the math ops).

If less than all the content of a execution lane's register files are shifted out during a shift sequence note that the content of the non shifted out registers of each execution lane remain in place (do not shift). As such, any non shifted content that is not replaced with shifted in content persists local to the execution lane across the shifting cycle. The memory unit ("M") observed in each execution lane is used to load/store data from/to the random access memory space that is associated with the execution lane's row and/or column within the execution lane array. Here, the M unit acts as a standard M unit in that it is often used to load/store data that cannot be loaded/stored from/to the execution lane's own register space. In various embodiments, the primary operation of the M unit is to write data from a local register into memory, and, read data from memory and write it into a local register.

With respect to the ISA opcodes supported by the ALU unit of the hardware execution lane 1201, in various embodiments, the mathematical opcodes supported by the hardware ALU include (e.g., ADD, SUB, MOV, MUL, MAD, ABS, DIV, SHL, SHR, MIN/MAX, SEL, AND, OR, XOR, NOT). As described just above, memory access instructions can be executed by the execution lane 1201 to fetch/store data from/to their associated random access memory. Additionally the hardware execution lane 1201 supports shift op instructions (right, left, up, down) to shift data within the two dimensional shift register structure. As described above, program control instructions are largely executed by the scalar processor of the stencil processor.

4.0 Implementation Embodiments

It is pertinent to point out that the various image processor architecture features described above are not necessarily limited to image processing in the traditional sense and therefore may be applied to other applications that may (or may not) cause the image processor to be re-characterized. For example, if any of the various image processor architecture features described above were to be used in the creation and/or generation and/or rendering of animation as opposed to the processing of actual camera images, the image processor may be characterized as a graphics processing unit. Additionally, the image processor architectural features described above may be applied to other technical applications such as video processing, vision processing, image recognition and/or machine learning. Applied in this manner, the image processor may be integrated with (e.g., as a co-processor to) a more general purpose processor (e.g., that is or is part of a CPU of computing system), or, may be a stand alone processor within a computing system.

The hardware design embodiments discussed above may be embodied within a semiconductor chip and/or as a description of a circuit design for eventual targeting toward a semiconductor manufacturing process. In the case of the later, such circuit descriptions may take of the form of a (e.g., VHDL or Verilog) register transfer level (RTL) circuit description, a gate level circuit description, a transistor level circuit description or mask description or various combinations thereof. Circuit descriptions are typically embodied on a computer readable storage medium (such as a CD-ROM or other type of storage technology).

From the preceding sections is pertinent to recognize that an image processor as described above may be embodied in hardware on a computer system (e.g., as part of a handheld device's System on Chip (SOC) that processes data from the handheld device's camera). In cases where the image processor is embodied as a hardware circuit, note that the image data that is processed by the image processor may be received directly from a camera. Here, the image processor may be part of a discrete camera, or, part of a computing system having an integrated camera. In the case of the later the image data may be received directly from the camera or from the computing system's system memory (e.g., the camera sends its image data to system memory rather than the image processor). Note also that many of the features described in the preceding sections may be applicable to a graphics processor unit (which renders animation).

FIG. 13 provides an exemplary depiction of a computing system. Many of the components of the computing system described below are applicable to a computing system having an integrated camera and associated image processor (e.g., a handheld device such as a smartphone or tablet computer). Those of ordinary skill will be able to easily delineate between the two. Additionally, the computing system of FIG. 13 also includes many features of a high performance computing system, such as a workstation or supercomputer.

As observed in FIG. 13, the basic computing system may include a central processing unit 1301 (which may include, e.g., a plurality of general purpose processing cores 1315_1 through 1315_N and a main memory controller 1317 disposed on a multi-core processor or applications processor), system memory 1302, a display 1303 (e.g., touchscreen, flat-panel), a local wired point-to-point link (e.g., USB) interface 1304, various network I/O functions 1305 (such as an Ethernet interface and/or cellular modem subsystem), a wireless local area network (e.g., WiFi) interface 1306, a wireless point-to-point link (e.g., Bluetooth) interface 1307 and a Global Positioning System interface 1308, various sensors 1309_1 through 1309_N, one or more cameras 1310, a battery 1311, a power management control unit 1312, a speaker and microphone 1313 and an audio coder/decoder 1314.

An applications processor or multi-core processor 1350 may include one or more general purpose processing cores 1315 within its CPU 1201, one or more graphical processing units 1316, a memory management function 1317 (e.g., a memory controller), an I/O control function 1318 and an image processing unit 1319. The general purpose processing cores 1315 typically execute the operating system and application software of the computing system. The graphics processing units 1316 typically execute graphics intensive functions to, e.g., generate graphics information that is presented on the display 1303. The memory control function 1317 interfaces with the system memory 1302 to write/read data to/from system memory 1302. The power management control unit 1312 generally controls the power consumption of the system 1300.

The image processing unit 1319 may be implemented according to any of the image processing unit embodiments described at length above in the preceding sections. Alternatively or in combination, the IPU 1319 may be coupled to either or both of the GPU 1316 and CPU 1301 as a co-processor thereof. Additionally, in various embodiments, the GPU 1316 may be implemented with any of the image processor features described at length above. The image processing unit 1319 may be configured with application software as described at length above. Additionally, a computing system such as the computing system of FIG. 13 may execute program code that performs the calculations described above that determine the configuration of an application software program onto an image processor.

Each of the touchscreen display 1303, the communication interfaces 1304-1307, the GPS interface 1308, the sensors 1309, the camera 1310, and the speaker/microphone codec 1313, 1314 all can be viewed as various forms of I/O (input and/or output) relative to the overall computing system including, where appropriate, an integrated peripheral device as well (e.g., the one or more cameras 1310). Depending on implementation, various ones of these I/O components may be integrated on the applications processor/multi-core processor 1350 or may be located off the die or outside the package of the applications processor/multi-core processor 1350.

In an embodiment one or more cameras 1310 includes a depth camera capable of measuring depth between the camera and an object in its field of view. Application software, operating system software, device driver software and/or firmware executing on a general purpose CPU core (or other functional block having an instruction execution pipeline to execute program code) of an applications processor or other processor may perform any of the functions described above.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired and/or programmable logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method performed by one or more computers, the method comprising:
   receiving a request to compute kernel assignments for an image processing pipeline to be executed on a device having a plurality of stencil processors, wherein the image processing pipeline comprises a plurality of kernels;
   generating a plurality of candidate kernel assignments, each candidate kernel assignment assigning each kernel of the image processing pipeline to a respective stencil processor of the plurality of stencil processors;
   computing a respective total weight for each of the plurality of candidate kernel assignments, the total weight for each candidate kernel assignment being based on respective transfer sizes of data transferred between kernels according to the candidate kernel assignment;
   selecting a candidate kernel assignment according to the respective total weights computed for each of the plurality of candidate kernel assignments; and
   assigning kernels of the plurality of kernels to respective stencil processors according to the selected candidate kernel assignment.

2. The method of claim 1, wherein the device comprises a plurality of line buffer units, and further comprising assigning one or more line buffer units to be a respective source of one or more kernels.

3. The method of claim 2, further comprising assigning one or more line buffer units to be a respective sink of one or more kernels.

4. The method of claim 3, wherein assigning the one or more line buffer units to be a respective sink of one or more kernels comprises:
   generating, for a particular producing kernel assigned to a particular stencil processor, a list of line buffer units sorted by transfer distances from the particular stencil processor; and
   assigning, to the particular producing kernel, a closest line buffer unit having enough memory to buffer data generated by the particular producing kernel.

5. The method of claim 4, wherein the transfer distances are based on a respective number of nodal hops within the network between kernels.

6. The method of claim 4, wherein the transfer distances are based on distances along a network ring of the network.

7. The computing system of claim 1, wherein each stencil processor comprises an execution lane array and a two-dimensional shift-register array.

8. One or more non-transitory computer storage media encoded with computer program instructions that when executed by one or more computers cause the one or more computers to perform operations comprising:
   receiving a request to compute kernel assignments for an image processing pipeline to be executed on a device having a plurality of stencil processors, wherein the image processing pipeline comprises a plurality of kernels;
   generating a plurality of candidate kernel assignments, each candidate kernel assignment assigning each kernel of the image processing pipeline to a respective stencil processor of the plurality of stencil processors;

computing a total weight for each of the plurality of candidate kernel assignments, the total weight for each candidate kernel assignment being based on respective transfer sizes of data transferred between kernels according to the candidate kernel assignment;

selecting a candidate kernel assignment according to the respective total weights computed for each of the plurality of candidate kernel assignments; and assigning kernels of the plurality of kernels to respective stencil processors according to the selected candidate kernel assignment.

9. The one or more non-transitory computer storage media of claim 8, wherein the device comprises a plurality of line buffer units, and wherein the operations further comprise assigning one or more line buffer units to be a respective source of one or more kernels.

10. The one or more non-transitory computer storage media of claim 9, wherein the operations further comprise assigning one or more line buffer units to be a respective sink of one or more kernels.

11. The one or more non-transitory computer storage media of claim 10, wherein assigning the one or more line buffer units to be a respective sink of one or more kernels comprises:

generating, for a particular producing kernel assigned to a particular stencil processor, a list of line buffer units sorted by transfer distances from the particular stencil processor; and assigning, to the particular producing kernel, a closest line buffer unit having enough memory to buffer data generated by the particular producing kernel.

12. The one or more non-transitory computer storage media of claim 11, wherein the transfer distances are based on a respective number of nodal hops within the network between kernels.

13. The one or more non-transitory computer storage media of claim 11, wherein the transfer distances are based on distances along a network ring of the network.

14. The one or more non-transitory computer storage media of claim 8, wherein each stencil processor comprises an execution lane array and a two-dimensional shift-register array.

15. A system, comprising:
one or more computers and one or more storage devices storing instructions that are operable, when executed by the one or more computers, to cause the one or more computers to perform operations comprising:

receiving a request to compute kernel assignments for an image processing pipeline to be executed on a device having a plurality of stencil processors, wherein the image processing pipeline comprises a plurality of kernels;

generating a plurality of candidate kernel assignments, each candidate kernel assignment assigning each kernel of the image processing pipeline to a respective stencil processor of the plurality of stencil processors;

computing a total weight for each of the plurality of candidate kernel assignments, the total weight for each candidate kernel assignment being based on respective transfer sizes of data transferred between kernels according to the candidate kernel assignment;

selecting a candidate kernel assignment according to the respective total weights computed for each of the plurality of candidate kernel assignments; and assigning kernels of the plurality of kernels to respective stencil processors according to the selected candidate kernel assignment.

16. The system of claim 15, wherein the device comprises a plurality of line buffer units, and wherein the operations further comprise assigning one or more line buffer units to be a respective source of one or more kernels.

17. The system of claim 16, wherein the operations further comprise assigning one or more line buffer units to be a respective sink of one or more kernels.

18. The system of claim 17, wherein assigning the one or more line buffer units to be a respective sink of one or more kernels comprises:

generating, for a particular producing kernel assigned to a particular stencil processor, a list of line buffer units sorted by transfer distances from the particular stencil processor; and assigning, to the particular producing kernel, a closest line buffer unit having enough memory to buffer data generated by the particular producing kernel.

19. The system of claim 18, wherein the transfer distances are based on a respective number of nodal hops within the network between kernels.

20. The system of claim 18, wherein the transfer distances are based on distances along a network ring of the network.

* * * * *